United States Patent
Tsujimoto

(10) Patent No.: US 10,694,063 B2
(45) Date of Patent: *Jun. 23, 2020

(54) MULTIFUNCTION PERIPHERAL WHICH CARRIES OUT PRINTING PROCESSING ACCORDING TO AN INSTRUCTION OF AN APPLICATION THAT OPERATES ON AN INFORMATION PROCESSING APPARATUS AND METHOD THEREFOR

(71) Applicant: Sharp Kabushiki Kaisha, Sakai, Osaka (JP)

(72) Inventor: Kunihiko Tsujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,549

(22) Filed: Jan. 3, 2019

(65) Prior Publication Data

US 2019/0141209 A1    May 9, 2019

Related U.S. Application Data

(63) Continuation of application No. 15/893,752, filed on Feb. 12, 2018, now Pat. No. 10,218,867, which is a (Continued)

(30) Foreign Application Priority Data

Jul. 23, 2012    (JP) .................................. 2012-163132

(51) Int. Cl.
*H04N 1/00*    (2006.01)
*H04N 1/32*    (2006.01)
(Continued)

(52) U.S. Cl.
CPC ....... *H04N 1/00954* (2013.01); *G06F 3/0484* (2013.01); *G06F 3/1207* (2013.01);
(Continued)

(58) Field of Classification Search
None
See application file for complete search history.

(56) References Cited

U.S. PATENT DOCUMENTS 9,131,168 B2 * 9/2015 Tsujimoto ............. G06F 3/1207
9,338,323 B2 * 5/2016 Tsujimoto ............. G06F 3/1207
(Continued)

OTHER PUBLICATIONS

Tsujimoto, "Multifunction Peropheral Which Carries Out Printing Processing According to an Instruction of an Application that Operates on an Information Processing Apparatus and Method Therefor", U.S. Appl. No. 15/893,752, filed Feb. 12, 2018.

*Primary Examiner* — Miya J Williams
(74) *Attorney, Agent, or Firm* — Keating & Bennett, LLP

(57) ABSTRACT

In a case of a first function of carrying out a cooperative processing in accordance with an instruction from a user of a multifunction peripheral (10), the user is set as an execution user. In a case of a second function of carrying out a cooperative processing in accordance with an instruction from an application, a user instructed by the application is set as an execution user. Further, in a case where an execution user of a cooperative processing carried out using the first function and an execution user of a cooperative processing carried out using the second function are identical, use history information of the execution user is managed as use history information of a single user. This makes it possible to appropriately manage use history information of a cooperative processing.

18 Claims, 13 Drawing Sheets

| USER ID | AUTHENTICATION INFORMATION | | THE NUMBER OF SHEETS USED | | | |
|---|---|---|---|---|---|---|
| | LOGIN NAME (ITEM IDENTIFICATION NAME: id_isername) | PASSWORD (ITEM IDENTIFICATION NAME: id_password) | COPY | SCAN | FAX | PRINT |
| 1 | UserA | Pass1 | 10 | 1 | 0 | 20 |
| 2 | UserB | Pass2 | 80 | 12 | 5 | 100 |
| ... | ... | ... | ... | ... | ... | ... |
| N | UserN | PassN | 0 | 0 | 0 | 0 |

Related U.S. Application Data continuation of application No. 15/456,687, filed on Mar. 13, 2017, now Pat. No. 9,924,063, which is a continuation of application No. 15/090,827, filed on Apr. 5, 2016, now Pat. No. 9,639,311, which is a continuation of application No. 14/811,899, filed on Jul. 29, 2015, now Pat. No. 9,338,323, which is a continuation of application No. 14/414,151, filed as application No. PCT/JP2013/069421 on Jul. 17, 2013, now Pat. No. 9,131,168.

(51) Int. Cl.

| | |
|---|---|
| *G06F 3/12* | (2006.01) |
| *G06F 21/60* | (2013.01) |
| *G06F 3/0484* | (2013.01) |
| *G06K 15/02* | (2006.01) |
| *H04N 1/44* | (2006.01) |
| *G06Q 10/10* | (2012.01) |
| *H04L 29/06* | (2006.01) |

(52) U.S. Cl.
CPC .......... *G06F 3/1273* (2013.01); *G06F 3/1285* (2013.01); *G06F 21/608* (2013.01); *G06K 15/1819* (2013.01); *H04N 1/0097* (2013.01); *H04N 1/00204* (2013.01); *H04N 1/00214* (2013.01); *H04N 1/00217* (2013.01); *H04N 1/00244* (2013.01); *H04N 1/00344* (2013.01); *H04N 1/00411* (2013.01); *H04N 1/00464* (2013.01); *H04N 1/00482* (2013.01); *H04N 1/00503* (2013.01); *H04N 1/00832* (2013.01); *H04N 1/00838* (2013.01); *H04N 1/00973* (2013.01); *H04N 1/32101* (2013.01); *H04N 1/32122* (2013.01); *H04N 1/4433* (2013.01); *G06K 15/1859* (2013.01); *G06Q 10/10* (2013.01); *H04L 63/083* (2013.01); *H04N 2201/001* (2013.01); *H04N 2201/0039* (2013.01); *H04N 2201/0094* (2013.01); *H04N 2201/3202* (2013.01); *H04N 2201/3205* (2013.01); *H04N 2201/3246* (2013.01)

(56) References Cited

U.S. PATENT DOCUMENTS

| | | | | |
|---|---|---|---|---|
| 9,639,311 | B2 * | 5/2017 | Tsujimoto | G06F 3/1207 |
| 9,924,063 | B2 * | 3/2018 | Tsujimoto | G06F 3/1207 |
| 10,218,867 | B2 * | 2/2019 | Tsujimoto | G06F 3/1207 |
| 2011/0093921 | A1 * | 4/2011 | Tsujimoto | G03G 21/02 |
| | | | | 726/3 |

* cited by examiner

FIG. 5

```
USER AUTHENTICATION

LOGIN NAME  [                    ]
PASSWORD    [                    ]

[ LOGIN ]
```

FIG. 6

```
SELECT APPLICATION

[ APPLICATION 1 ]
        [ APPLICATION 2 ]
        [ APPLICATION 3 ]
```

FIG. 7

| APPLICATION NAME | APPLICATION URL |
|---|---|
| APPLICATION 1 | http://example.com/app1 |
| APPLICATION 2 | http://example.com/app2 |
| APPLICATION 3 | http://example.com/app3 |

FIG. 8

SELECT PRINT DATA
☐ FILE A
☑ FILE B
☐ FILE D
☐ FILE H

PRINT

FIG. 9

| USER ID | AUTHENTICATION INFORMATION | | THE NUMBER OF SHEETS USED | | | |
|---|---|---|---|---|---|---|
| | LOGIN NAME (ITEM IDENTIFICATION NAME: id_isername) | PASSWORD (ITEM IDENTIFICATION NAME: id_password) | COPY | SCAN | FAX | PRINT |
| 1 | UserA | Pass1 | 10 | 1 | 0 | 20 |
| 2 | UserB | Pass2 | 80 | 12 | 5 | 100 |
| ... | ... | ... | ... | ... | ... | ... |
| N | UserN | PassN | 0 | 0 | 0 | 0 |

FIG. 12

```
SELECT PRINT DATA
                    SUBJECT OF COUNTING  [UserB    ▼]
    ☐  FILE A
    ☑  FILE B
    ☐  FILE D                              [ PRINT ]
    ☐  FILE H
```

FIG. 13

| GROUP NAME | USER NAME |
|---|---|
| GROUP 1 | User A |
| GROUP 1 | User B |
| GROUP 1 | User C |
| GROUP 2 | User X |
| GROUP 2 | User Y |

MULTIFUNCTION PERIPHERAL WHICH CARRIES OUT PRINTING PROCESSING ACCORDING TO AN INSTRUCTION OF AN APPLICATION THAT OPERATES ON AN INFORMATION PROCESSING APPARATUS AND METHOD THEREFOR

TECHNICAL FIELD

The present invention relates to a multifunction peripheral control system in which a multifunction peripheral and an information processing apparatus, which are connected to each other via a communication network so as to communicate with each other, cooperatively operate together.

BACKGROUND ART

Conventionally, there is known a technique in which (i) a multifunction peripheral (MFP; multifunction peripheral apparatus) and an information processing apparatus (server apparatus) are connected to each other via a communication network so as to communicate with each other and (ii) the multifunction peripheral and the information processing apparatus carry out a cooperative processing in which the multifunction peripheral and the information processing apparatus cooperatively operate together. Typical examples of such a technique encompass (i) a technique in which a multifunction peripheral obtains print data from an information processing apparatus and carries out a print processing, (ii) a technique in which an application that operates on an information processing apparatus is used from a multifunction peripheral, and (iii) a technique in which an operation of a multifunction peripheral is controlled by an application that operates on an information processing apparatus (see, for example, Patent Literatures 1 through 3).

Further, there is known a multifunction peripheral which manages, for each user, use history information (e.g., the number of prints, the number of scans, the number of transmission times of image data, a destination of image data transmission, etc.) which is based on a history of operations conducted by a user who has logged in to the multifunction peripheral. Similarly, there is known an application which (i) operates on an information processing apparatus and (ii) manages, for each user, use history information which is based on a history of operations conducted by a user who has logged in to the application.

CITATION LIST

Patent Literatures

Patent Literature 1
Japanese Patent Application Publication, Tokukai, No. 2012-008711 A (Publication Date: Jan. 12, 2012)
Patent Literature 2
Japanese Patent Application Publication, Tokukai, No. 2007-174400 A (Publication Date: Jul. 5, 2007)
Patent Literature 3
Japanese Patent Application Publication, Tokukai, No. 2011-124652 A (Publication Date: Jun. 23, 2011)

SUMMARY OF INVENTION

Technical Problem

In a case where a cooperative processing is carried out between a multifunction peripheral and an application that operates on an information processing apparatus, it is preferable to reflect a result of the cooperative processing in the use history information managed by the multifunction peripheral.

For example, in both cases (i) where a user make a print request by operating an input section of the multifunction peripheral (in a case of pull printing) and (ii) where the user makes a print request from a web page of an application that operates on the information processing apparatus (in a case of push printing), it is preferable that recording of the number of prints, restriction of the number of prints, and the like be applied to the same account, if the operations carried out in the respective cases are conducted by the same user. That is, both from the viewpoint of user convenience and the viewpoint of user management, use history information of print processings of a single user is preferably managed such that a sum of the number of prints printed by the push printing and the number of prints printed by the pull printing is managed as the use history information of the single user.

According to the conventional technique, however, it is impossible to integrate and manage, as use history information of a user, (i) a result which is obtained in a case where the user operates an input section of a multifunction peripheral so as to cause a cooperative processing to be carried out and (ii) a result which is obtained in a case where the user logs in to an application operating on an information processing apparatus and causes a cooperative processing to be carried out.

That is, in a case where the user logs in to the application that operates on the information processing apparatus and causes the cooperative processing to be carried out between the application and the multifunction peripheral, the following problems (i) through (iii) may arise. That is, (i) a use history regarding the cooperative processing is reflected only in use history information managed by the information processing apparatus and not in use history information managed by the multifunction peripheral, (ii) use history information of a user is recorded under an account which is different from the user's account managed by the multifunction peripheral (that is, the use history information is recorded under an account managed in the application that operates on the information processing apparatus and corresponding to the user's account), and (iii) use history information of a user is erroneously recorded under an account of another user logged in to the multifunction peripheral.

Alternatively, the following operation needs to be conducted in order to reflect, in the use history information managed by the multifunction peripheral, the result which is obtained in a case where the user (i) logs in to the application that operates on the information processing apparatus and (ii) causes the cooperative processing to be carried out. That is, after instructing the application that operates on the information processing apparatus to carry out the cooperative processing, the user needs to conduct, from the input section of the multifunction peripheral, an operation for reflecting the result of the cooperative processing in the use history information managed by the multifunction peripheral.

The present invention has been made in view of the problems. An object of the present invention is that, in a multifunction peripheral having (i) a first function of carrying out a cooperative processing in accordance with an instruction inputted by the user from an input section of the multifunction peripheral and (ii) a second function of carrying out the cooperative processing in accordance with an instruction from an application that operates on an information processing apparatus which is connected to the multifunction peripheral via a communication network, use history information of users be appropriately managed for each user, regardless of whether the first function has been used or the second function has been used.

Solution to Problem

A multifunction peripheral in accordance with one aspect of the present invention is a multifunction peripheral which carries out a cooperative processing together with an application that operates on an information processing apparatus, the multifunction peripheral and the information processing apparatus being connected to each other via a communication network so as to communicate with each other, comprising: an input section configured to receive an instruction inputted by a user; a storage section configured to store use history information such that the use history information is associated with an execution user who carries out the cooperative processing, the use history information being indicative of a history of use of the cooperative processing; and a control section configured to control an operation of each section of the multifunction peripheral, the multifunction peripheral having (i) a first function of carrying out the cooperative processing in accordance with an instruction which the input section receives from the user and (ii) a second function of carrying out the cooperative processing in accordance with an instruction from the application, in a case where the cooperative processing is carried out using the second function, the control section (i) setting, as an execution user who carries out the cooperative processing, a user designated by the application and (ii) carrying out the cooperative processing, in a case where the cooperative processing is carried out using the first function, the control section (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the control section causing use history information which is stored in the storage section and corresponds to the execution user to be updated in accordance with a result of carrying out the cooperative processing, regardless of whether the first function is used or the second function is used.

A multifunction peripheral control system in accordance with one aspect of the present invention is a multifunction peripheral control system comprising a multifunction peripheral and an information processing apparatus, the multifunction peripheral and the information processing apparatus being connected to each other via a communication network so as to communicate with each other, the multifunction peripheral and an application which operates on the information processing apparatus carrying out a cooperative processing together, the multifunction peripheral including: an input section configured to receive an instruction inputted by a user; and a control section configured to control an operation of each section of the multifunction peripheral, the information processing apparatus including an application processing section configured to execute the application, the multifunction peripheral control system further comprising a storage section configured to store use history information such that the use history information is associated with an execution user who carries out the cooperative processing, the use history information being indicative of a history of use of the cooperative processing, the multifunction peripheral control system having (i) a first function of carrying out the cooperative processing in accordance with an instruction which the input section receives from the user and (ii) a second function of carrying out the cooperative processing in accordance with an instruction from the application, in a case where the cooperative processing is carried out using the second function, the control section (i) setting, as an execution user who carries out the cooperative processing, a user designated by the application and (ii) carrying out the cooperative processing, in a case where the cooperative processing is carried out using the first function, the control section (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the control section causing use history information which is stored in the storage section and corresponds to the execution user to be updated in accordance with a result of carrying out the cooperative processing, regardless of whether the first function is used or the second function is used.

A method, in accordance with one aspect of the present invention of managing a multifunction peripheral is a method of managing a multifunction peripheral, the multifunction peripheral carrying out a cooperative processing together with an application that operates on an information processing apparatus, the multifunction peripheral and the information processing apparatus being connected via a communication network so as to communicate with each other, the multifunction peripheral including an input section, the multifunction peripheral having (i) a first function of carrying out the cooperative processing in accordance with an instruction which the input section receives from a user and (ii) a second function of carrying out the cooperative processing in accordance with an instruction from the application, the method comprising the step of: (A) storing use history information such that the use history information is associated with an execution user who carries out the cooperative processing, the use history information being indicative of a history of use of the cooperative processing, in a case where the cooperative processing is carried out using the second function, the method (i) setting, as an execution user who carries out the cooperative processing, a user designated by the application and (ii) carrying out the cooperative processing, in a case where the cooperative processing is carried out using the first function, the method (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the step (A) involving causing use history information corresponding to the execution user to be updated in accordance with a result of carrying out the cooperative processing, regardless of whether the first function is used or the second function is used.

Advantageous Effects of Invention

According to a multifunction peripheral of the present invention, a multifunction peripheral control system of the present invention, and a method, of the present invention, of managing a multifunction peripheral, use history information can be appropriately managed regardless of whether a cooperative processing is carried out by a first function or by a second function. Further, use histories corresponding to a single user can be managed as use history information corresponding to the single user, regardless of whether or not the first function has been used or the second function has been used.

BRIEF DESCRIPTION OF DRAWINGS

FIG. 5 is an explanatory diagram illustrating an example of an authentication information input screen displayed on a display section of a multifunction peripheral included in the multifunction peripheral control system illustrated in FIG. 1.

FIG. 6 is an explanatory diagram illustrating an example of an application selection screen displayed on the display section of the multifunction peripheral included in the multifunction peripheral control system illustrated in FIG. 1.

FIG. 7 is an explanatory diagram illustrating an example of external application information which is stored in the multifunction peripheral of the multifunction peripheral control system illustrated in FIG. 1 and in which each application is associated with corresponding information indicative of an access destination accessed in a case where each application is selected.

FIG. 8 is an explanatory diagram illustrating an example of an application screen displayed on the display section of the multifunction peripheral of the multifunction peripheral control system illustrated in FIG. 1.

FIG. 9 is an explanatory diagram illustrating an example of a user management table stored in the multifunction peripheral control system illustrated in FIG. 1.

FIG. 12 is an explanatory diagram illustrating an example of an application screen displayed on a display section of a multifunction peripheral included in a multifunction peripheral control system in accordance with another embodiment of the present invention.

FIG. 13 is an explanatory diagram illustrating an example of user information stored in the multifunction peripheral control system illustrated in FIG. 12.

DESCRIPTION OF EMBODIMENTS

Embodiment 1

The following description will discuss an embodiment of the present invention.

(1-1. Overall Arrangement of Multifunction Peripheral Control System 1)

Figure 1:
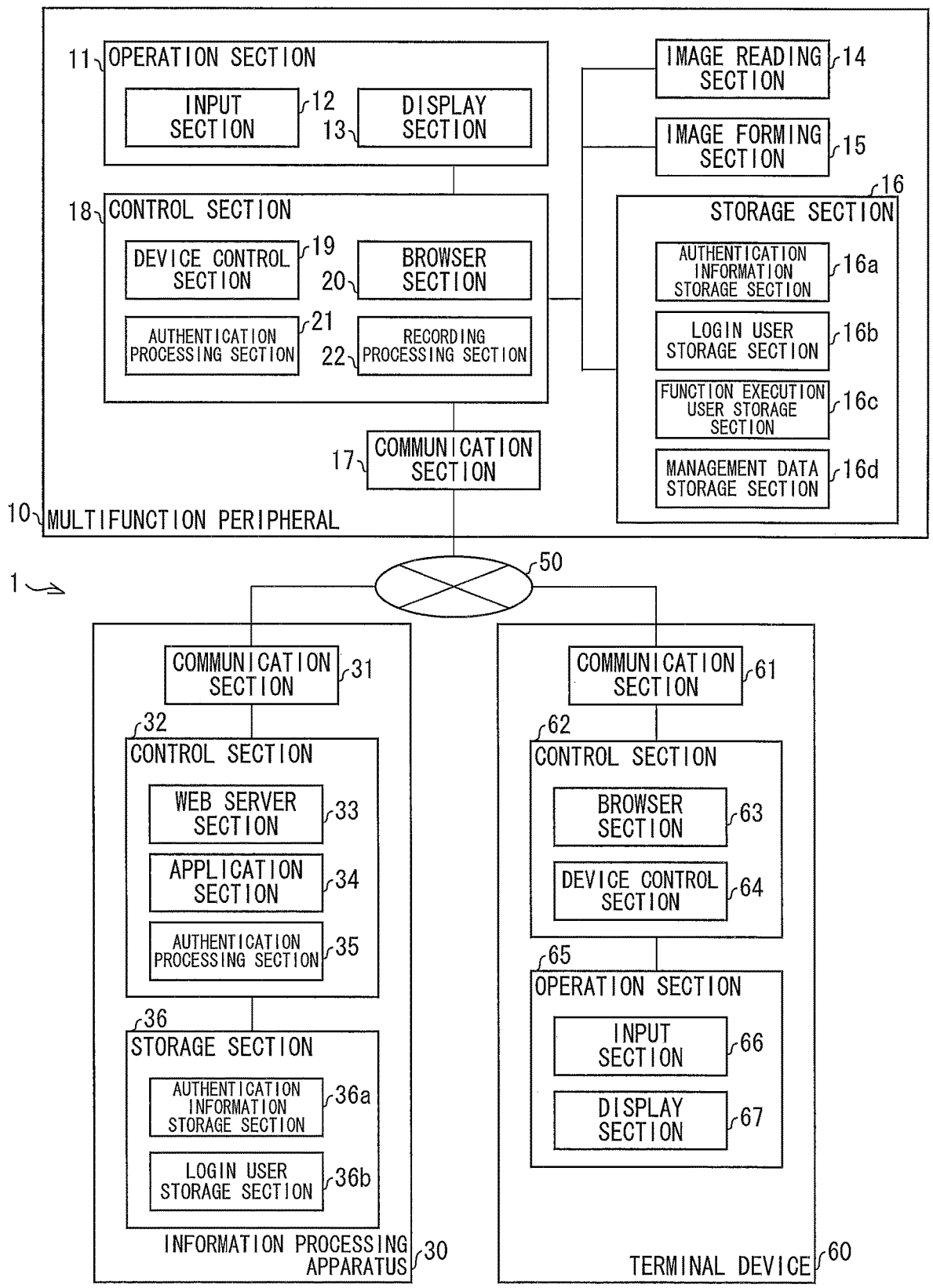
FIG. 1 is an explanatory diagram illustrating an arrangement of a multifunction peripheral control system in accordance with one embodiment of the present invention.

FIG. 1 is an explanatory diagram illustrating an arrangement of a multifunction peripheral control system 1 in accordance with the present embodiment. As illustrated in FIG. 1, the multifunction peripheral control system 1 includes a multifunction peripheral (MFP) 10, an information processing apparatus (server apparatus) 30, and a terminal device 60 which are connected to each other via a communication network 50 so as to communicate with each other. Note that the multifunction peripheral control system 1 can include one or a plurality of multifunction peripherals 10, one or a plurality of information processing apparatuses 30, and one or a plurality of terminal devices 60.

The communication network 50 may be a wired arrangement, such as IEEE1394, a USB, a power-line carrier, a cable TV line, a telephone line, an ADSL line, or a serial cable; or a wireless arrangement, such as an infrared ray (e.g., IrDA or remote control), Bluetooth (registered trademark), 802.11 radio, HDR, a mobile phone network, a satellite line, or a terrestrial digital network. Further, the multifunction peripheral 10, the information processing apparatus 30, and the terminal device 60 are each configured to carry out communication by an HTTP (Hyper Text Transfer Protocol) method, which is a protocol used for communication between a web server and a web browser (e.g., a request and a transmission of a web page). Note, however, that a communication protocol to be used among the multifunction peripheral 10, the information processing apparatus 30, and the terminal device 60 is not particularly limited, and another communication protocol can be used.

(1-2. Arrangement of Multifunction Peripheral 10)

The multifunction peripheral 10 is a digital multifunction peripheral or an analog multifunction peripheral which has a function of (i) receiving control information in an HTML format from the information processing apparatus 30 by using HTTP and (ii) carrying out various device functions of the multifunction peripheral 10 on the basis of the control information received from the information processing apparatus 30. Examples of the device functions encompass a scan function, a print function, a copy function, a facsimile transmission and reception function, and a communication function. Note, however, that the device functions of the multifunction peripheral 10 are not limited to the above-mentioned functions. For example, the multifunction peripheral 10 can be configured not to include some of the above-mentioned functions, and can be configured to have another device function in place of some of the above-mentioned functions or in addition to the above-mentioned functions.

The multifunction peripheral 10 includes an operation section 11, an image reading section 14, an image forming section 15, a storage section 16, a communication section 17, and a control section 18. The operation section 11 includes an input section 12 and a display section 13. The storage section 16 includes an authentication information storage section 16a, a login user storage section 16b, a function execution user storage section 16c, and a management data storage section 16d. The control section 18 includes a device control section 19, a browser section 20, an authentication processing section 21, and a recording processing section 22.

The operation section 11 is a user interface which (i) notifies a user of various types of information in accordance with an instruction of the control section 18, (ii) receives an input inputted by the user, and (iii) transmits the input received to the control section 18. The operation section 11 includes (i) the input section (operation input section) 12 including various input keys and (ii) the display section 13 which is constituted by, for example, an LCD (Liquid Crystal Display) or the like. Note that the operation section 11 can be a touch panel in which the input section 12 and the display section 13 are integral with each other.

The image reading section 14 (i) includes a scanner and a document conveying section which conveys a document to a position of the scanner and (ii) carries out a scan function of reading, as image data, (a) text, (b) an image, and the like which are printed on the document. Note that the image reading section 14 reads an image at a given resolution.

The image forming section 15 is a member for printing, on a recording sheet such as printing paper, an image (text/photograph/graphic) in accordance with image data. According to the present embodiment, an image forming apparatus of an electrophotographic printing method is employed as the image forming section 15. The image forming apparatus includes a photoreceptor drum, a charging device, an exposure device, a developing device, a transfer device, a fixing device, a paper tray, and the like. Note, however, that the arrangement of the image forming section 15 is not limited to this. For example, an image forming apparatus of an inkjet printing method or an image forming apparatus of another image forming system can be employed. According to the present embodiment, it is possible to carry out, by using the image forming section 15, (i) a copy function of printing image data inputted from the image reading section 14 and (ii) a printer function of printing image data inputted from an external device.

The storage section 16 is a storage section which stores various types of data (operation screen data, various lookup tables, etc.) which are handled by the multifunction peripheral 10. Further, the storage section 16 includes the authentication information storage section 16a, the login user storage section 16b, the function execution user storage section 16c, and the management data storage section 16d.

The authentication information storage section 16a stores user authentication information (e.g., login name and password) of a user to be given permission to use the multifunction peripheral 10. Note that according to the present embodiment, the multifunction peripheral 10 and the information processing apparatus 30 periodically communicate with each other so that user authentication information stored in the authentication information storage section 16a is updated on the basis of user authentication information stored in an authentication information storage section 36a (described later) of the information processing apparatus 30. Alternatively, it is possible to employ an arrangement in which, in a case where either one of (i) the user authentication information stored in the authentication information storage section 36a of the information processing apparatus 30 and (ii) the user authentication information stored in the authentication information storage section 16a of the multifunction peripheral 10 is updated, the user authentication information is reflected in the other one of (i) and (ii). As such, according to the present embodiment, the information processing apparatus 30 and the multifunction peripheral 10 can use common user authentication information. That is, in a case where a user who has logged in to the multifunction peripheral 10 by operating the input section 12 of the multifunction peripheral 10 is identical to a user who has logged in to an application that operates on the information processing apparatus 30, a common account is applied to such a user.

The login user storage section 16b stores login information (e.g., login name) of a user logged in to the multifunction peripheral 10.

The function execution user storage section 16c stores user information of a user who has made an execution request (function execution request) for carrying out a cooperative processing in which an application that operates on the information processing apparatus 30 and the multifunction peripheral 10 cooperatively operate together. Note that the function execution user storage section 16c can be configured to store not only user information of the user who has made a function execution request to the application that operates on the information processing apparatus 30, but also user information of a user who has made a function execution request to (i) an application that operates on another device connected to the multifunction peripheral 10 via the communication network 50 or (ii) an application that operates on the multifunction peripheral 10.

The management data storage section 16d stores a user management table for managing, for each user, use history information (summary information) of the multifunction peripheral 10 (or of a cooperative processing between the multifunction peripheral 10 and an application that operates on the information processing apparatus 30). Note that the management data storage section 16d can be arranged such that the user management table stores, in addition to the use history information, information such as (i) a use-possible condition under which each user can use a multifunction peripheral (or a cooperative processing between the multifunction peripheral and the application that operates on the information processing apparatus 30) and (ii) a use-restriction condition under which use of the multifunction peripheral (or the cooperative processing between the multifunction peripheral and the application that operates on the information processing apparatus 30) for each user is restricted.

Note that an arrangement of the storage section 16 is not specifically limited. For example, various conventionally well-known storage sections such as a hard disk can be employed.

The communication section 17 is a communication interface which communicates with an external device such as the information processing apparatus 30 via the communication network 50. According to the present embodiment, as described above, the communication section 17 communicates with the information processing apparatus 30 by using HTTP.

The control section 18 is a computer device constituted by (i) an arithmetic processing section (not shown) such as a CPU or a dedicated processor and (ii) a storage section (not shown) such as a RAM, a ROM, or a HDD. The control section 18 realizes a function of each of the device control section 19, the browser section 20, the authentication processing section 21, and the recording processing section 22 by reading out and executing a program, stored in the storage section, for carrying out various information and various controls.

The device control section 19 controls an operation of each section of the multifunction peripheral 10. That is, the device control section 19 controls operations and the like of the operation section 11, the image scanning section 14, the image forming section 15, and the communication section 17. For example, the device control section 19 controls the operation of the image scanning section 14 so as to obtain data of a scan image. Further, the device control section 19 controls the operation of the image forming section 15 so as to form (output), on a recording material, an image in accordance with image data. Moreover, the device control section 19 (i) controls the operation of the communication section 17 so as to communicate with an external resource (e.g., the information processing apparatus 30) and (ii) transmits and receives image data, control information, and the like.

The browser section (web browser section) 20 operates in accordance with software for browsing a web page. The browser section 20 causes the display section 13 to display an image in accordance with screen data which is supplied from a web server (e.g., a web server section 34 of the information processing apparatus 30). Further, in a case where an instruction to an application on the web server is inputted by a user from the input section 12, the browser section 20 notifies the device control section 19 of information in accordance with the instruction inputted by the user. This causes the device control section 19 to (i) access the application on the web server (e.g., an application section 34 of the information processing apparatus 30) via the communication section 17, (ii) transmit a screen acquisition request, and (iii) obtain, from the application, screen data in accordance with the instruction inputted. Note that it is possible to employ, as the software, software generally used of a web browser. Further, it is possible to employ, as the application on the web server, for example, a homepage content on the Internet, an external application that cooperatively operates together with the multifunction peripheral 10, or the like.

Further, a screen acquisition request from the multifunction peripheral 10 to the web server (e.g., the web server section 34 of the information processing apparatus 30) is made by using a GET command or a POST command of an HTTP protocol. The web server transmits, in response, a screen content in accordance with the screen acquisition request received from the multifunction peripheral 10. In a case where the screen content is written in HTML, the browser section 20 analyzes the screen content, generates screen data, and causes the display section 13 to display a display screen on the basis of the HTML.

The authentication processing section 21 carries out a user authentication processing in which (i) user information which is inputted, from the operation section 11, by a user who intends to use the multifunction peripheral 10 is compared with (ii) user authentication information which (a) is stored in the authentication information storage section 16a and (b) is indicative of a user to be given permission to use the multifunction peripheral 10. As a result of the user authentication processing, in a case where the authentication processing section 21 determines to permit the user to use the multifunction peripheral 10, (in a case where the authentication processing section 21 determines that the user information inputted from the operation section 11 matches the user authentication information which (a) is stored in advance in the authentication information storage section 16a and (b) is indicative of a user to be given permission to use the multifunction peripheral 10), the authentication processing section 21 notifies the device control section 19 that the user has been permitted to use the multifunction peripheral 10. The device control section 19 (i) causes the display section 13 to display an operation screen of the multifunction peripheral 10 so that the multifunction peripheral 10 becomes available and (ii) controls the recording processing section 22 so that the login user storage section 16b stores the user information of the user with respect to whom the user authentication processing has been carried out (login information of the user who has logged in).

The recording processing section 22 controls writing of various types of data in the storage section 16 and reading of various types of data from the storage section 16.

(1-3. Arrangement of Information Processing Apparatus 30)

As illustrated in FIG. 1, the information processing apparatus 30 includes a communication section 31, a control section 32, and a storage section 36. Further, the control section 32 includes a web server section 33, an application section 34, and an authentication processing section 35. Further, the storage section 36 includes an authentication information storage section 36a and a login user storage section 36b.

The communication section 31 communicates with the multifunction peripheral 10 and the terminal device 60 via the communication network 50. Note that the communication section 31 communicates with the multifunction peripheral 10 and the terminal device 60 by using an HTTP communication protocol.

The control section 32 is a computer device constituted by (i) an arithmetic processing section (not shown) such as a CPU or a dedicated processor and (ii) a storage section (not shown) such as a RAM, a ROM, or a HDD. The control section 32 realizes a function of each of the web server section 33 and the application section 34 by reading out and executing a program, stored in the storage section, for carrying out various information and various controls.

The web server section 33 operates in accordance with software generally used of a web server. The web server section 33 has a function of (i) receiving a request (e.g., an HTTP request) from the multifunction peripheral and the terminal device 60 via the communication section 31, (ii) obtaining, from the application section 34, a file, image data, print data, control information, and the like in accordance with the request, and (iii) transmitting the file, the image data, the print data, the control information, and the like to the multifunction peripheral 10 or the terminal device 60 via the communication section 31.

The application section 34 operates in accordance with a predetermined web application in response to an instruction from the web server section 33. That is, the application section 34 operates in accordance with various web applications that operate on the web server. Examples of the web application encompass (i) an application that provides a homepage content on the Internet and (ii) a multifunction peripheral control application that cooperatively operates together with the multifunction peripheral 10 so as to control an operation of the multifunction peripheral 10.

For example, in a case where a request (an HTTP request) from the multifunction peripheral 10 or the terminal device 60 is a transmission request for transmitting a display screen, the application section 34 operates in accordance with a display screen transmission application. Specifically, the application section 34 (i) reads out, from a storage section (not illustrated), HTML data of the display screen which is indicated by the transmission request and (ii) transmits the HTML data to the web server section 33. This causes the data of the display screen to be transmitted to a device which has transmitted the request from the web server section 33 (the multifunction peripheral 10 or the terminal device 60).

Further, in a case where a request from the multifunction peripheral 10 or the terminal device 60 is a transmission request for transmitting print data, the application section 34 operates in accordance with a print application. Specifically, the application section 34 (i) obtains, from a folder whose name is indicated by the transmission request, print data whose file name is designated and (ii) transmits the print data to the web server section 33. This causes the print data to be transmitted from the web server section 33 to a device which carries out a print processing (e.g., the multifunction peripheral 10). In a case where the transmission request for transmitting the print data is made from the terminal device 60, the terminal device 60 (i) includes, in the transmission request, address information of a device to which the print data is to be transmitted (e.g., the multifunction peripheral 10) and (ii) transmits the transmission request to the information processing apparatus 30.

Note that the application section 34 can be configured to execute a plurality of types of applications (web applications).

The storage section 36 is a storage section that stores various types of data which are handled by the information processing apparatus 30. Further, the storage section 36 includes the authentication information storage section 36a and the login user storage section 36b.

The authentication information storage section 36a stores user authentication information (e.g., login name and password) of a user to be given permission to use an application (web application) that operates on the information processing apparatus 30. Further, the login user storage section 36b stores login information (e.g., login name) of a user logged in to an application.

Note that an arrangement of the storage section 36 is not particularly limited. For example, various conventionally well-known storage sections such as a hard disk can be employed as the storage section 36.

(1-4. Arrangement of Terminal Device 60)

The terminal device 60 has a function of accessing the information processing apparatus 30 via the communication network 50 and using an application (web application) that operates on the application section 34 of the information processing apparatus 30. An arrangement of the terminal device 60 is not particularly limited. For example, a personal computer, various mobile terminals (e.g., a mobile phone, a smartphone, a tablet terminal, a PDA (Personal Digital Assistance), a portable game machine, etc.) can be employed as the terminal device 60.

As illustrated in FIG. 1, the terminal device 60 includes a communication section 61, a control section 62, and an operation section 65. Further, the control section 62 includes a browser section 63 and a device control section 64. The operation section 65 includes an input section 66 and a display section 67.

The communication section 61 is a communication interface which communicates with an external device such as the information processing apparatus 30 via the communication network 50.

The operation section 65 is a user interface which (i) notifies a user of various types of information in accordance with an instruction of the control section 62, (ii) receives an input inputted by the user, and (iii) transmits the input received to the control section 62. The operation section 65 includes (i) the input section (operation input section) 66 including various input keys and (ii) the display section 67 which is constituted by, for example, an LCD (Liquid Crystal Display) or the like. Note that the operation section 65 can be a touch panel in which the input section 66 and the display section 67 are integral with each other.

The control section 62 is a computer device constituted by (i) an arithmetic processing section (not shown) such as a CPU or a dedicated processor and (ii) a storage section (not shown) such as a RAM, a ROM, or a HDD. The control section 62 realizes a function of each of the browser section (web browser section) 63 and the device control section 64 by reading out and executing a program, stored in the storage section, for carrying out various information and various controls.

The browser section operates in accordance with software for browsing a web page. The browser section causes the display section 67 to display an image in accordance with screen data which is supplied from a web server (e.g., a web server section 34 of the information processing apparatus 30). Further, in a case where an instruction is inputted, with respect to an application on the web server, by a user from the input section 66, the browser section 63 notifies the device control section 64 of information in accordance with the instruction inputted by the user. This causes the device control section 64 to (i) access the application on the web server (e.g., the application section 34 of the information processing apparatus 30) via the communication section 61, (ii) transmit a screen acquisition request, and (iii) obtain, from the application, screen data in accordance with the instruction inputted. Note that it is possible to employ, as the software, software generally used of a web browser.

Further, a screen acquisition request from the terminal device 60 to the web server (e.g., the web server section 34 of the information processing apparatus 30) is made by using the GET command or the POST command of the HTTP protocol. The web server transmits, in response, a screen content in accordance with the screen acquisition request received from the terminal device 60. In a case where the screen content is written in HTML, the browser section 63 analyzes the screen content, generates screen data, and causes the display section 67 to display a display screen on the basis of the HTML.

The device control section 64 controls an operation of each section of the terminal device 60. That is, the device control section 64 controls operations of the operation section 65 and the communication section 61. For example, the device control section 64 (i) controls the operation of the communication section 61 so as to communicate with an external resource (e.g., the information processing apparatus 30) and (ii) transmits and receives image data, control information, and the like. Further, the device control section 64 controls the operation of the display section 67 to display a display screen in accordance with the image data. Further, the device control section 64 controls the operation of the input section 66 to obtain information indicative of a content of an operation input inputted by the user from the input section 66.

(1-5. Overview of Processing in Multifunction Peripheral Control System 1)

The following description will discuss an operation of the multifunction peripheral control system 1. Note that an example is described here in which the application section 34 of the information processing apparatus 30 executes a print application which (i) transmits print data to the multifunction peripheral 10 and (ii) causes the multifunction peripheral 10 to carry out a print processing. Note that a user can use the print application (i) by operating the operation section 11 of the multifunction peripheral 10 and (ii) by operating the operation section 65 of the terminal device 60.

Figure 2:
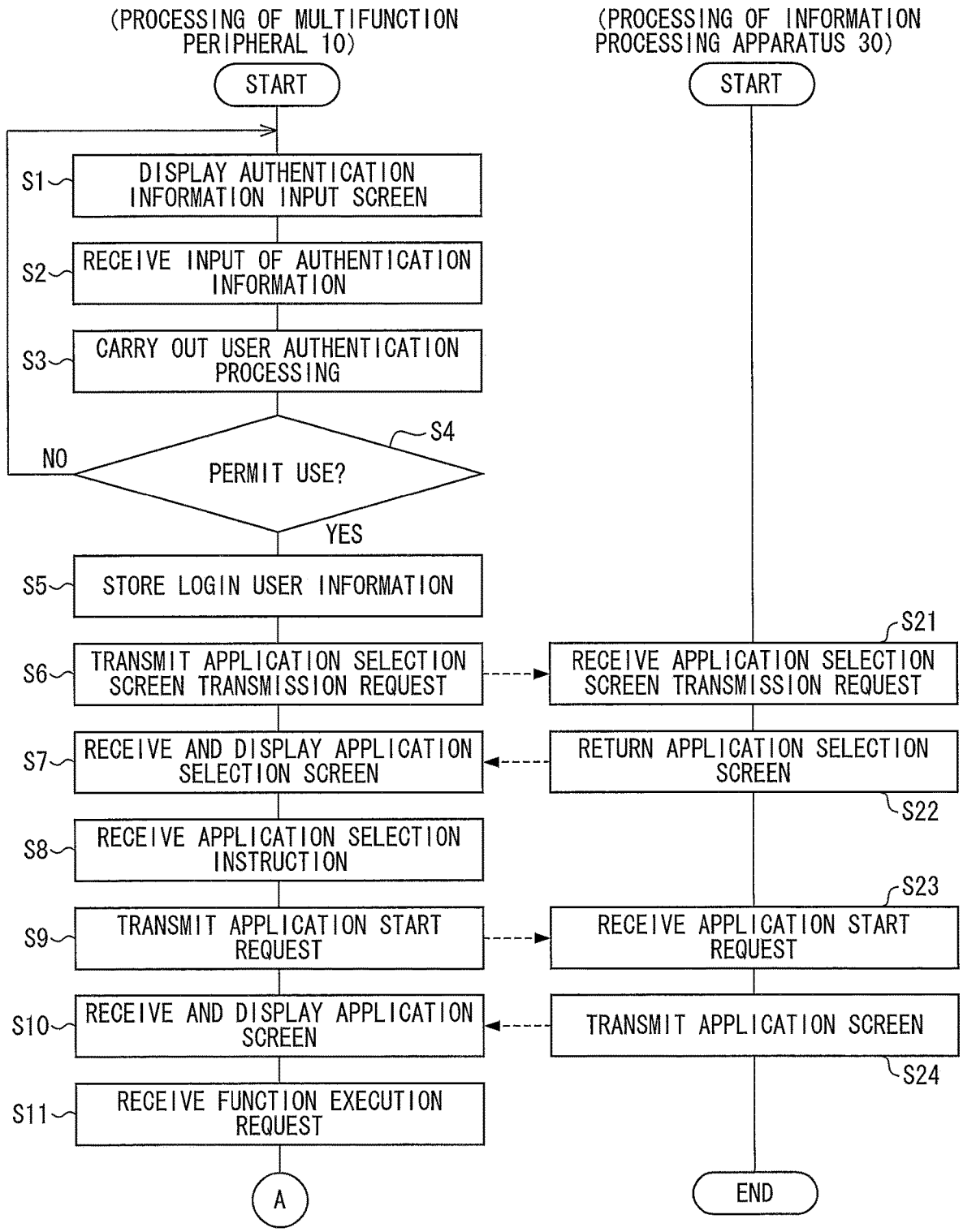
FIG. 2 is a flow chart illustrating a flow of a processing in the multifunction peripheral control system illustrated in FIG. 1.
Figure 3:
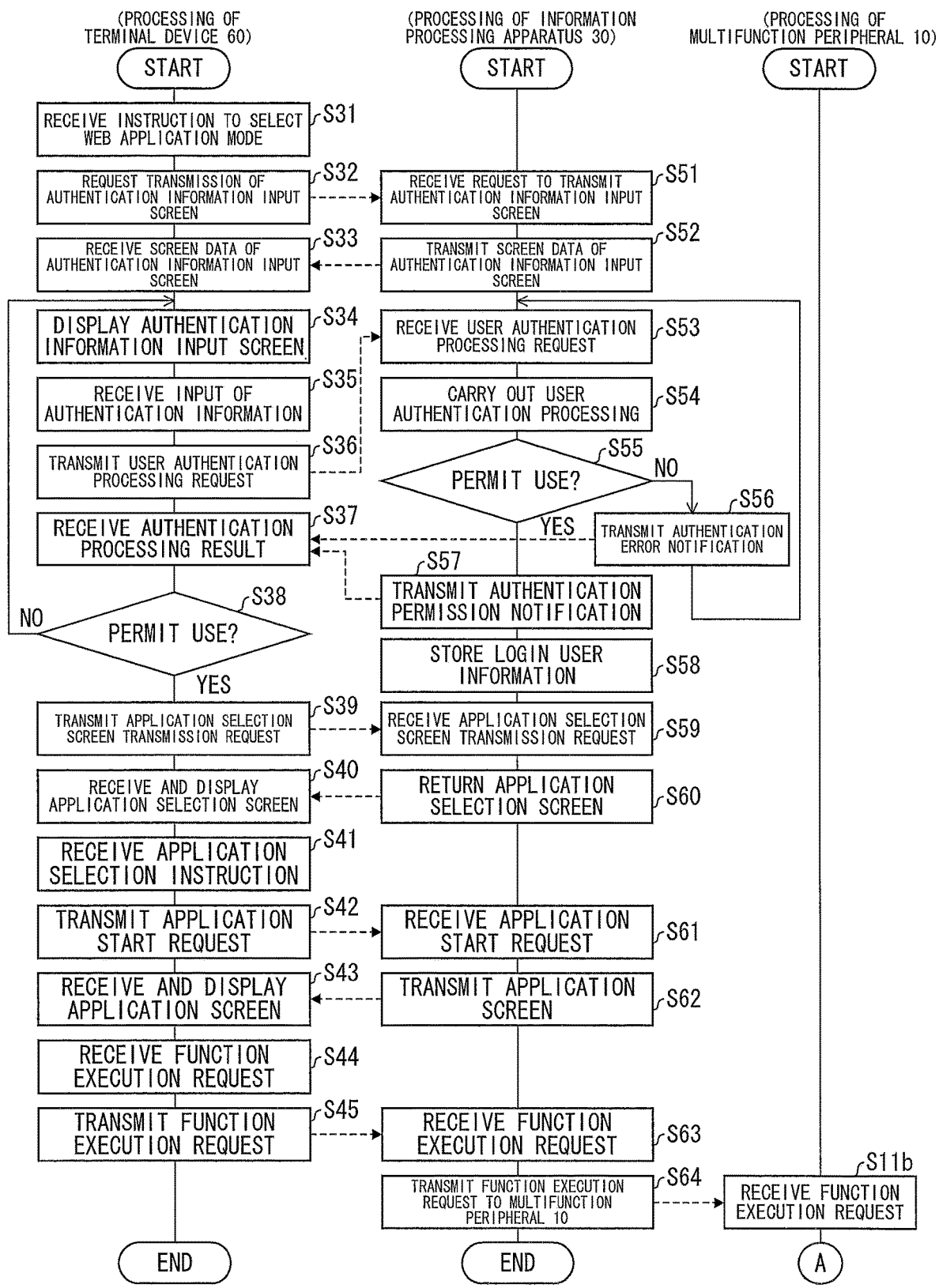
FIG. 3 is a flow chart illustrating a flow of a processing in the multifunction peripheral control system illustrated in FIG. 1.
Figure 4:
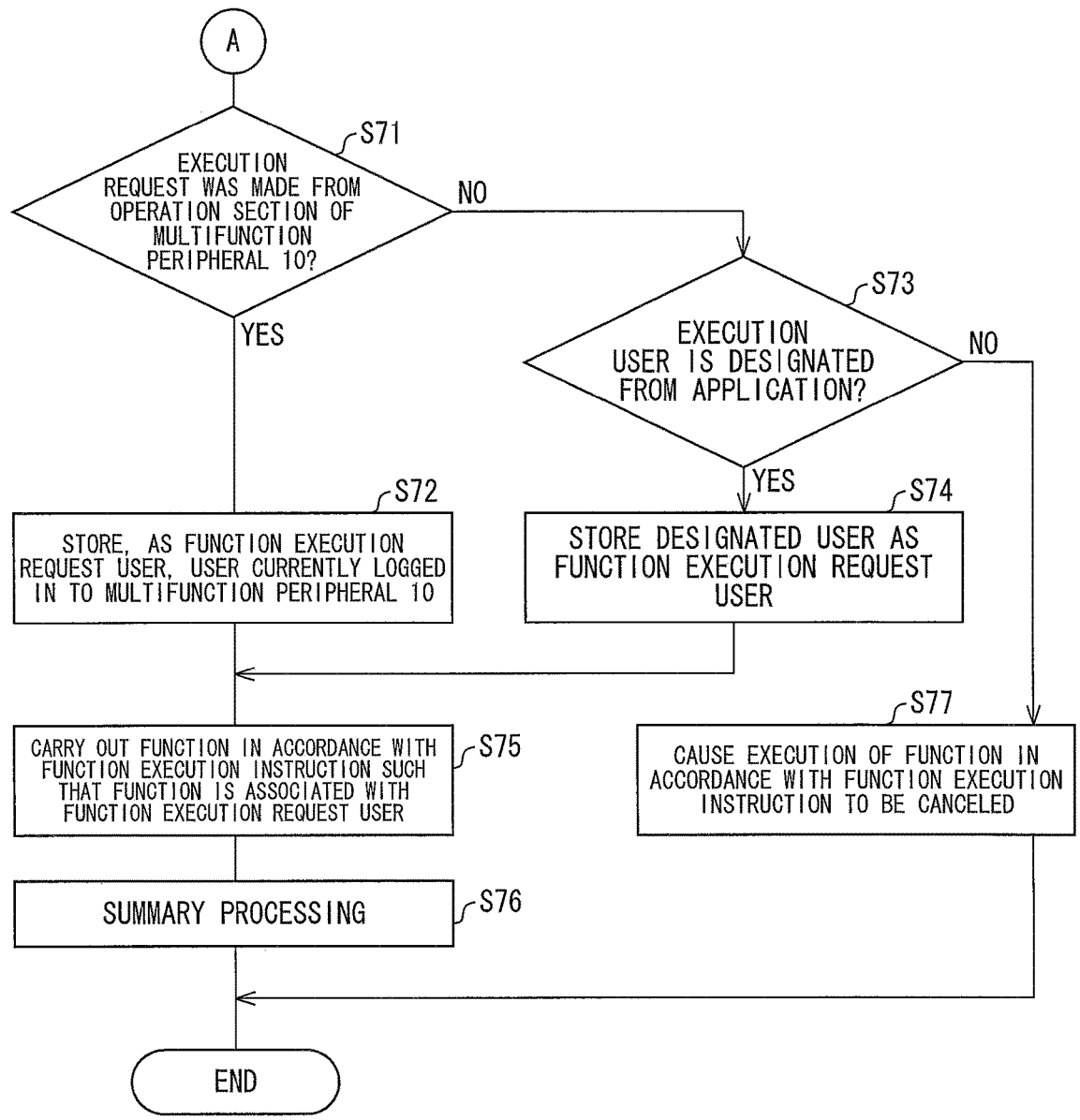
FIG. 4 is a flow chart illustrating a flow of a processing in the multifunction peripheral control system illustrated in FIG. 1.

FIG. 2 is a flow chart illustrating a flow of a processing in the multifunction peripheral control system 1 in a case where a user uses the print application by operating the operation section 11 of the multifunction peripheral 10. FIG. 3 is a flow chart illustrating a flow of a processing in the multifunction peripheral control system 1 in a case where the user uses the print application by operating the operation section 65 of the terminal device 60. Further, FIG. 4 is a flow chart illustrating a flow of a processing in the multifunction peripheral 10 after the multifunction peripheral 10 receives a function execution instruction which is transmitted from the information processing apparatus 30 in the processing illustrated in FIG. 2 or 3.

(1-5-1. Processing in a Case where Application is Used from Multifunction Peripheral)

The following description will discuss, with reference to FIG. 2, a processing in a case where a user uses a print application by operating the operation section 11 of the multifunction peripheral 10.

As illustrated in FIG. 2, the device control section 19 of the multifunction peripheral 10 (i) reads out screen data of an authentication information input screen which screen data is stored in the storage section 16 and (ii) causes the display section 13 to display the authentication information input screen (S1). FIG. 5 is an explanatory diagram illustrating an example of the authentication information input screen. In the example illustrated in FIG. 5, the authentication information input screen is configured such that (i) a user is prompted to input a login name and a password as user authentication information and (ii) the user inputs a login name and a password by operating the input section 12 and then presses a login button so as to input user authentication information.

When the authentication processing section 21 of the multifunction peripheral 10 receives the user authentication information inputted by the user via the input section 12 (S2), the authentication processing section 21 carries out a user authentication processing by making comparison between (i) the user authentication information inputted and (ii) user authentication information which (a) is stored in advance in the authentication information storage section 16a and (b) is indicative of a user to be given permission to use the multifunction peripheral 10 (S3). The authentication processing section 21 then determines whether or not to permit the user to use the multifunction peripheral 10 (to log in to the multifunction peripheral 10) (S4).

In a case where the authentication processing section 21 determines in S4 not to permit the user to use the multifunction peripheral 10 (to log in to the multifunction peripheral 10), the device control section 19 returns to the processing in S1. The multifunction peripheral 10 can be configured such that the display section 13 displays, at this point, a message indicating that the user authentication processing has failed, a message prompting the user to input again the user authentication information, or the like.

On the other hand, in a case where the authentication processing section 21 determines in S4 to permit the user to use the multifunction peripheral 10 (to log in to the multifunction peripheral 10), the recording processing section 22 causes the login user storage section 16b to store, as login user information, the user information (e.g., login name) of the user who has logged in to the multifunction peripheral 10 (S5). Note that the login user information is stored only while the user is logged in to the multifunction peripheral 10. In a case where a logout processing of the user is carried out, the login user information is deleted from the login user storage section 16b.

Further, in a case where the authentication processing section 21 determines in S4 to permit the user to use the multifunction peripheral 10 (to log in to the multifunction peripheral 10), the browser section 20 transmits, to the information processing apparatus 30 via the communication section 17, a transmission request for transmitting an application selection screen (S6).

When the web server section 33 of the information processing apparatus 30 receives the transmission request for transmitting the application selection screen, which transmission request has been transmitted from the multifunction peripheral 10 (S21), the web server section 33 (i) causes the application section 34 to generate screen data of an application selection screen for causing the user of the multifunction peripheral 10 to select a desired application from among applications which can be used from the multifunction peripheral 10 and (ii) transmits the screen data to the multifunction peripheral 10 (S22).

When the browser section 20 of the multifunction peripheral 10 receives the screen data of the application selection screen from the information processing apparatus 30 via the communication section 17, the browser section 20 controls the display section 13 to display an application selection screen in accordance with the screen data received (S7).

FIG. 4 is an explanatory diagram illustrating an example of an application selection screen which is displayed on the display section 13. In the example illustrated in FIG. 4, three types of applications, that is, applications 1 through 3 are selectable. Note that the multifunction peripheral 10 can be configured such that, for example, information indicative of names and types of the respective applications is displayed on the display section 13.

Subsequently, when the browser section 20 receives an instruction to select an application which instruction has been inputted by the user from the input section 12 (S8), the browser section 20 transmits, to the information processing apparatus 30 via the communication section 17, a start request (initial screen acquisition request) for starting the application selected by the user (S9).

Specifically, according to the present embodiment, for example, as illustrated in FIG. 7, the storage section 16 stores, in advance, external application information in which each of applications selectable on the application selection screen is associated with corresponding information indicative of an access destination (application URL) accessed in a case where the each of the applications is selected. Alternatively, the external application information is added to the screen data of the application selection screen transmitted from the information processing apparatus 30 to the multifunction peripheral 10. The device control section 19 controls the browser section 20 and the communication section 17 to transmit, on the basis of the external application information and to an application URL corresponding to an application selected by the user, a start request for starting the application. Note that the start request for starting the application (application screen acquisition request) is made by using the GET command or the POST command of the HTTP protocol.

When the web server section 33 of the information processing apparatus 30 receives the start request for starting the application from the multifunction peripheral 10 (S23), the web server section 33 (i) obtains, from the application section 34, screen data (screen content) of an application in accordance with the start request received and (ii) transmits, in response, the screen data to the multifunction peripheral 10 (S24).

When the browser section 20 of the multifunction peripheral 10 receives the screen data of the application from the information processing apparatus 30, the browser section 20 controls the display section 13 to display a screen in accordance with the screen data (S10). For example, in a case where the screen data is written in HTML, the device control section 19 causes the browser section 20 to analyze a content of the HTML and generate screen data. The device control section 19 then causes the display section 13 to display a screen in accordance with the screen data, so that a screen based on the HTML is displayed.

Subsequently, when the browser section 20 receives a function execution request inputted by the user via the input section 12 (S11), the browser section 20 carries out a processing in S71 and the subsequent processings in FIG. 4. The processing in S71 and the subsequent processings will be described later.

FIG. 8 is an explanatory diagram illustrating an example of an application screen which is displayed in the processing in S10. In the example illustrated in FIG. 8, the print application (i) transmits, to the multifunction peripheral 10, a display screen which displays a list of print data that a user who is currently logged in to the multifunction peripheral 10 can select as data to be printed from among print data stored in a storage section (not illustrated) of the information processing apparatus 30 and (ii) causes the display section 13 to display the list. Then, in a case where the user selects data to be printed and press a print button (in a case where the user makes a print function execution request), the browser section 20 transmits, to the device control section 19, a transmission request for transmitting a print request for causing the device control section 19 to request the information processing apparatus 30 to give an instruction to print the print data selected by the user.

Note that the application can be configured such that a Java (registered trademark) Script for making a function execution request to the device control section 19 is embedded in the HTML of the screen data (screen content) of the application and when a button in the screen is operated, a Java (registered trademark) Script corresponding to the button is executed so that the function execution request is transmitted from the browser section 20 to the device control section 19.

(1-5-2. Processing in a Case Where Application is Used from Terminal Device)

The following description will discuss, with reference to FIG. 3, a processing in a case where a user uses a print application by operating the operation section 65 of the terminal device 60.

As illustrated in FIG. 3, when the device control section 64 of the terminal device 60 receives an instruction to select a web application mode (S31), the device control section 64 transmits a transmission request for transmitting the authentication information input screen to the information processing apparatus 30 (S32). Note that according to the present embodiment, the terminal device 60 has (i) a normal mode in which an application that operates on the terminal device 60 itself is used and (ii) a web application mode in which an application (web application) that operates on the information processing apparatus 30 is used from the terminal device 60 so that a user can select, from the operation section 65, which one of the two modes is to be used.

When the web server section 33 of the information processing apparatus 30 receives the transmission request for transmitting the authentication information input screen transmitted from the terminal device 60 (S51), the web server section 33 reads out screen data of the authentication information screen from the storage section 36 and transmits, in response, the screen data to the terminal device 60 (S52).

When the device control section 64 of the terminal device 60 receives the screen data of the authentication information input screen from the information processing apparatus 30 (S33), the device control section 64 controls the display section 67 to display the authentication information input screen in accordance with the screen data (S34). Note that the terminal device 60 can be configured such that the screen data of the authentication information input screen (i) is stored in advance in a storage section (not illustrated) of the terminal device 60 and (ii) is read out so as to be displayed. For example, a screen similar to that illustrated in FIG. 5 can be employed as the authentication information input screen to be displayed on the display section 67.

Subsequently, when the device control section 64 of the terminal device 60 receives user authentication information inputted by the user on the authentication information input screen via the input section 66 (S35), the device control section 64 transmits, to the information processing apparatus 30, a user authentication processing request including the user authentication information received (S36).

The authentication processing section 35 of the information processing apparatus 30 (i) carries out a user authentication processing by making comparison between (A) the user authentication information included in the user authentication processing request received from the terminal device 60 and (B) user authentication information which (a) is stored in advance in the authentication information storage section 36a and (b) is indicative of a user to be given permission to use the application (S54) and (ii) determines whether or not to permit the user to use the application (to log in to the application) (S55).

In a case where the authentication processing section 35 determines in S55 not to permit the user to use the application (to log in to the application), the web server section 33 transmits an authentication error notification to the terminal device 60 (S56) and returns to the processing in S53.

On the other hand, in a case where the authentication processing section 35 determines in S55 to permit the user to use the application (to log in to the application), the web server section 33 (i) transmits an authentication permission notification to the terminal device 60 (S57) and (ii) causes the login user storage section 36b to store the user authentication information of the user who has been given permission to log in to the application (S58).

When the device control section 64 of the terminal device 60 receives a result of the user authentication processing returned from the information processing apparatus 30 (S37), the device control section 64 determines, in accordance with the result of the user authentication processing, whether or not the user has been given permission to use the application (S38).

Then, in a case where the device control section 64 determines in S38 that the user has not been given permission to use the application (in a case where an authentication error notification is received from the information processing apparatus 30), the device control section 64 (i) returns to the processing in S34, (ii) displays again the authentication information input screen, and (iii) prompts the user to input again the user authentication information.

On the other hand, in a case where the device control section 64 determines in S38 that the user has been given permission to log in to the application, the device control section 19 transmits, to the information processing apparatus 30, a transmission request for transmitting an application selection screen (S39).

When the web server section 33 of the information processing apparatus 30 receives the transmission request for transmitting an application selection screen which transmission request has been transmitted from the multifunction peripheral 60 (S59), the web server section 33 (i) generates screen data of an application selection screen for causing the user of the multifunction peripheral 60 to select a desired application from among applications which can be used from the multifunction peripheral 60 and (ii) transmits the screen data to the multifunction peripheral 60 (S60).

When the device control section 64 of the terminal device 60 receives the screen data of the application selection screen from the information processing apparatus 30 via the communication section 17, the device control section 64 controls the browser section 63 and the display section 67 so that the display section 67 displays an application screen in accordance with the screen data received (S40). For example, an application selection screen similar to that illustrated in FIG. 6 can be employed as the application selection screen.

Subsequently, when the device control section 64 receives an instruction to select an application which instruction has been inputted by the user from the input section 66 (S41), the device control section 64 transmits, to the information processing apparatus 30 via the browser section 63 and the communication section 61, a start request (application screen acquisition request) for starting the application selected by the user (S42). Specifically, according to the present embodiment, for example, as illustrated in FIG. 7, the storage section 16 stores, in advance, external application information in which each of applications selectable on the application selection screen is associated with corresponding information indicative of an access destination (application URL) accessed in a case where the each of the applications is selected. The device control section 64 (i) controls the browser section 63 and the communication section 61, (ii) accesses, on the basis of the external application information, an application URL corresponding to the application selected by the user, and (iii) transmits a start request for starting the application to the application URL corresponding to the application. Note that the start request for starting the application (application screen acquisition request) is made by using the GET command or the POST command of the HTTP protocol.

When the web server section 33 of the information processing apparatus 30 receives the start request for starting the application from the terminal device 60 (S61), the web server section 33 in response transmits, to the terminal device 60, screen data (screen content) of an application in accordance with the start request received (S62).

When the device control section 64 of the terminal device 60 receives the screen data of the application from the information processing apparatus 30, the device control section 64 controls the browser section 63 and the display section 67 so that the display section 67 displays a screen in accordance with the screen data (S43). For example, in a case where the screen data is written in HTML, the device control section 64 causes the browser section 63 to analyze a content of the HTML and generate screen data. The device control section 64 then causes the display section 67 to display a screen in accordance with the screen data, so that a screen based on the HTML is displayed.

Subsequently, when the device control section 64 receives a function execution request inputted by the user from the input section 66 (S44), the device control section 64 transmits, to the information processing apparatus 30 (a URL corresponding to an application which is currently executed) via the browser section 63 and the communication section 61, the function execution request inputted from the input section 66 (S45). It is possible to employ an arrangement in which the display section 67 displays, at this point, a message indicating that the function execution request is being made. Note that, for example, an application screen similar to that illustrated in FIG. 8 can be employed as the application screen.

When the web server section 33 of the information processing apparatus 30 receives the function execution request from the terminal device 60 (S63), the web server section 33 (i) causes an application section 34 corresponding to the function execution request received to generate a function execution request with respect to the multifunction peripheral 10 and (ii) transmits the function execution request to the multifunction peripheral 10 (S64). At this time, the application section 34 (i) reads out, from the login user storage section 36b, user information of a user who is currently logged in to the application, (ii) includes, in a function execution instruction, the user information of the user currently logged in as user information of a user who has made the function execution request, and (iii) transmits the function execution instruction to the multifunction peripheral 10. That is, when the multifunction peripheral 10 carries out a function in accordance with a function execution request, the application section 34 includes, in a function execution instruction, an instruction for causing the function to be carried out by setting, as an execution user who carries out the function, a user who is currently logged in to an application. The function execution instruction includes, for example, (i) a control command for controlling a device function of the multifunction peripheral 10, (ii) various data (e.g., image data, a transmission destination to which data is transmitted, etc.) which are used in the multifunction peripheral 10, and (iii) the like.

The device control section 19 of the multifunction peripheral 10 receives the function execution request transmitted from the information processing apparatus 30 (S11b) and carries out the processing in S71 and the subsequent processings in FIG. 4. The processing in S71 and the subsequent processings will be described later.

(1-5-3. Processing After Multifunction Peripheral Receives Function Execution Instruction)

The following description will discuss, with reference to the flow chart illustrated in FIG. 4, a processing to be carried out after the multifunction peripheral 10 receives a function execution request from the browser section 20 and the information processing apparatus 30.

When the device control section 19 of the multifunction peripheral 10 receives a function execution request in the processing in S11 illustrated in FIG. 2 or in S11b illustrated in FIG. 3 from the browser section 20 or the information processing apparatus 30, the device control section 19 determines whether or not the function execution request has been made via the operation section 11 (browser section 20) of itself (multifunction peripheral 10) (S71).

For example, the device control section 19 makes the above-mentioned determination on the basis of an IP address of a transmission source from which the function execution request has been received. That is, in a case where the IP address of the transmission source of the function execution request is an IP address of the multifunction peripheral 10 or a loopback address, the device control section 19 determines that the function execution request has been made via the operation section 11 (browser section 20) of the multifunction peripheral 10. On the other hand, in a case where the IP address of the transmission source of the function execution request is neither the IP address of the multifunction peripheral 10 nor the loopback address, the device control section 19 determines that the function execution request has been made from another device.

In a case where the device control section 19 determines in S71 that the function execution request has been made via the operation section 11 of the multifunction peripheral 10, the device control section 19 (i) reads out user information which (a) has been stored in the login user storage section 16b and (b) is indicative of a user who is currently logged in to the multifunction peripheral 10 and (ii) causes the function execution user storage section 16c to store the user information as a function execution request user (S72).

On the other hand, in a case where the device control section 19 determines in S71 that the function execution request has not been made via the operation section 11 of the multifunction peripheral 10, the device control section 19 determines whether or not the function execution instruction received from the information processing apparatus 30 includes information which designates a function execution user (execution user) (S73).

Then, in a case where the device control section 19 determines in S73 that the function execution instruction includes the information which designates the function execution user (execution user), the device control section 19 causes the function execution user storage section 16c to store the user designated by the information as the function execution request user (S74).

Note that in a case where the device control section determines in S73 that the function execution instruction does not include the information which designates the function execution user (execution user), the device control section 19 causes an execution of a function in accordance with the function execution instruction received from the information processing apparatus 30 to be cancelled (S77), and ends the processing. Examples of the case where the function execution instruction does not include the information which designates the function execution user (execution user) encompass a case where a printer driver of the terminal device 60 transmits a print job to the multifunction peripheral 10 via the communication network 50 (in a case of a normal print processing via a network). In this case, user information of an authenticated user is not attached to the print job. Accordingly, it is determined that the function execution instruction does not include the information which designates the function execution user (execution user), and an execution of printing is canceled.

After causing, in S72 or S74, the function execution user storage section 16c to store the function execution request user, the device control section 19 carries out a function in accordance with the function execution request such that the function is associated with the function execution request user stored in the function execution user storage section 16c (such that the function execution request user is set as the execution user) (S75).

For example, in a case where the function execution request is an execution request for carrying out a function of (i) obtaining print data from the information processing apparatus 30 (a print application that operates on the application section 34 of the information processing apparatus 30) and (ii) carrying out a print processing, the device control section 19 transmits a print data acquisition request to the information processing apparatus 30, obtains the print data, and carries out the print processing. The multifunction peripheral 10 can be configured such that the display section 13 displays, at this point, a message indicating that a print processing is currently carried out (a function is currently carried out). Further, the multifunction peripheral 10 can be configured such that the device control section 19 (i) transmits, to the information processing apparatus 30, an acquisition request for obtaining a control command for controlling the device function of the multifunction peripheral 10, (ii) obtains a control command, and (iii) controls the device function of the multifunction peripheral 10 in accordance with the control command.

Subsequently, the device control section 19 carries out a summary processing of updating summary information (use history information) of the execution user associated with the function in S75 (S76), and ends the processing.

Note that, according to the present embodiment, the multifunction peripheral 10 is configured such that in a case where the device control section 19 determines in S73 in FIG. 4 that the function execution instruction received from the information processing apparatus 30 does not include the information which designates the function execution user (execution user), the device control section 19 causes the execution of the function in accordance with the function execution instruction received from the information processing apparatus 30 to be canceled in S77. However, the arrangement of the multifunction peripheral 10 is not limited to this.

For example, the multifunction peripheral 10 can be configured such that in a case where the device control section 19 determines in S73 in FIG. 4 that the function execution instruction received from the information processing apparatus 30 does not include the information which designates the function execution user (execution user), the device control section 19 (i) does not carry out the function in accordance with the function execution instruction, (ii) causes the storage section 16 to store (put on hold) tentatively the function execution instruction, and (iii) carries out the function in accordance with the function execution instruction which has been stored in the storage section 16 since when a given operation was conducted via the operation section 11 of the multifunction peripheral 10.

Examples of the given operation encompass an operation in which a user who has logged in to the multifunction peripheral 10 (i) makes a request, from the operation section 11, to start up a UI (user interface) for causing a function execution instruction, which has been put on hold, to be executed and (ii) selects, from the UI, a function execution instruction (job) which has been put on hold. As such, even in a case where the application that operates on the application section 34 cannot provide user information to the job (e.g., in a case where the application does not have a function of providing user information to the job), it is possible to cause the multifunction peripheral 10 to carry out a processing in accordance with the function execution request received from the application.

FIG. 9 is an explanatory diagram illustrating an example of a user management table for managing summary information (use history information) of each user. According to the present embodiment, the management data storage section 16d stores the user management table. In a case where a processing is carried out using the device function of the multifunction peripheral 10 (or in a case where the cooperative processing is carried out between the multifunction peripheral 10 and the application that operates on the information processing apparatus 30), the device control section 19 controls the recording processing section 22 to update, in the user management table, the summary information of a user (execution user) who has made the function execution request for carrying out the function. For example, in the example illustrated in FIG. 9, in a case where a user A carries out a print processing in which the number of prints is 10, 10 is added to the number of prints carried out by the user A. That is, since the number of prints before the function is carried out by the user A is 20 in the example illustrated in FIG. 9, 10, which is the number of prints having been newly carried out by the user A, is added, so that the number of prints carried out by the user A is updated to 30.

(1-5-4. Example of Data Transmission and Reception in a Case Where Application is Used from Multifunction Peripheral)

Figure 10:
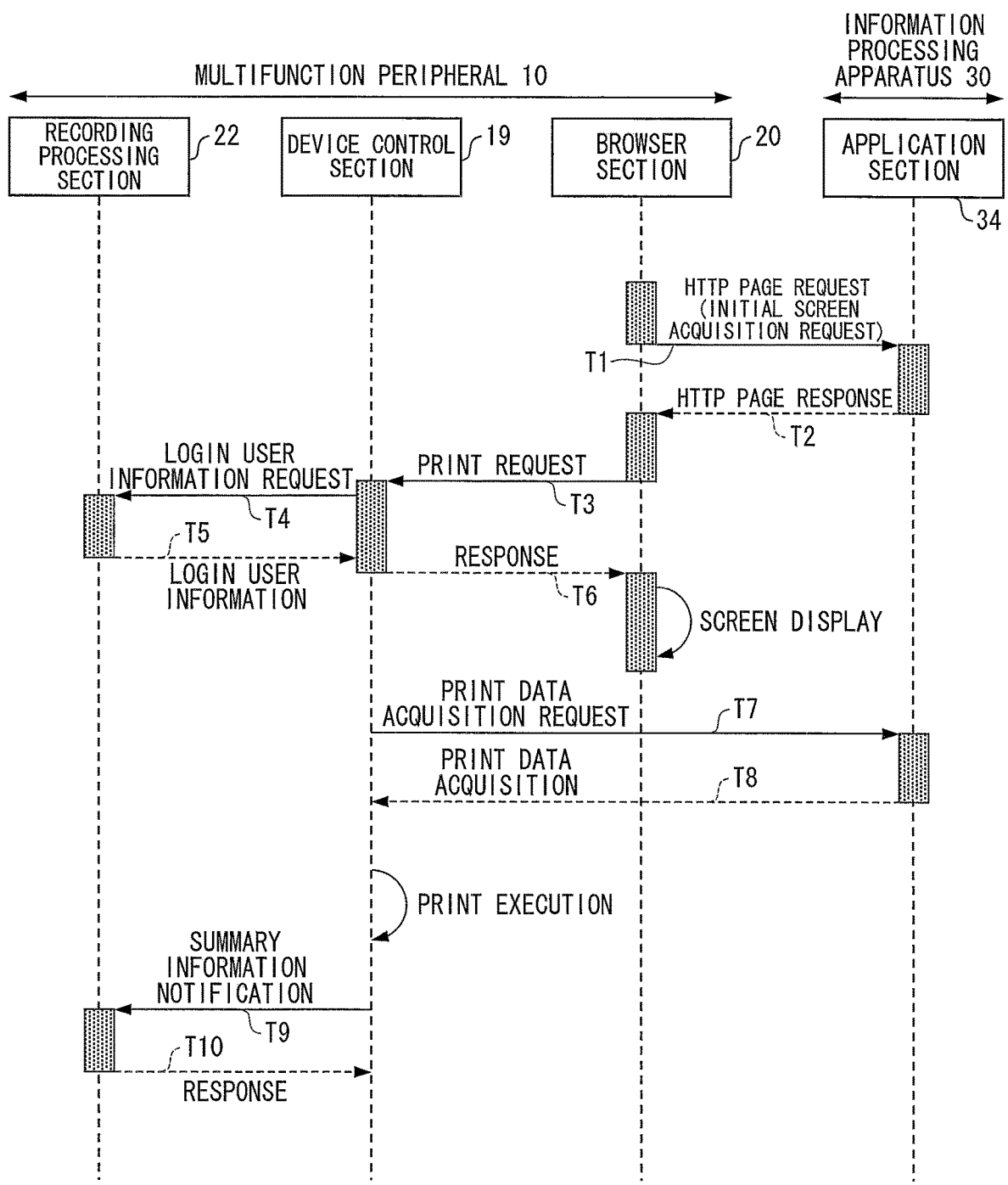
FIG. 10 is an explanatory diagram illustrating a flow of data in the multifunction peripheral control system illustrated in FIG. 1.

FIG. 10 is an explanatory diagram illustrating a flow of data in the processing in S8 and the subsequent processings in FIG. 2. As illustrated in FIG. 10, when the browser section 20 receives, in S8 in FIG. 2, the instruction to select an application which instruction has been inputted by the user, the browser section 20 transmits an initial screen acquisition request (HTTP Page request) to the application section 34 of the information processing apparatus 30 (T1).

When the application section 34 receives the initial screen acquisition request, the application section 34 transmits, in response, screen data of an initial screen in accordance with the initial screen acquisition request (HTTP Page response) (T2).

The browser section 20 (i) causes the display section 13 to display an initial screen in accordance with the screen data of the initial screen obtained from the application section 34, (ii) obtains a print request (function execution request) inputted by the user on the initial screen via the input section 12, and (iii) transmits the print request to the device control section 19 (T3).

When the device control section 19 receives the print request (function execution request), the device control section 19 transmits a login user information request to the recording processing section 22 (T4). The recording processing section 22 (i) reads out login user information (user information which (a) is stored in the login user storage section 16b and (b) is indicative of a user who is currently logged in to the multifunction peripheral 10) and (ii) transmits the login user information to the device control section 19 (T5).

Further, the device control section 19 responds to the browser section 20 that the device control section 19 has received the print request (function execution request) (T6). When the browser section 20 receives this response, the browser section 20 causes the display section 13 to display a message that the function is currently being carried out.

Further, the device control section 19 transmits a print data acquisition request (function execution request) to the application section 34 of the information processing apparatus 30 (T7). The application section 34 transmits print data (function execution instruction) in accordance with the print data acquisition request to the multifunction peripheral 10 (T8).

When the device control section 19 receives the print data transmitted from the information processing apparatus 30, the device control section 19 carries out a processing of determining whether or not the processing in S71 in FIG. 4, that is, the print request (function execution request) corresponding to the print data (function execution instruction) has been made via the operation section 11 of the multifunction peripheral 10.

Then, since the print request has been made via the operation section 11 of the multifunction peripheral 10 in the example illustrated in FIG. 10, the print processing is carried out as illustrated in S72 in FIG. 4 so that a user who is currently logged in to the multifunction peripheral (a user corresponding to a user of the login user information obtained in T5) is set as the execution user. Note that in the example illustrated in FIG. 10, the login user information is obtained before the print data acquisition request is transmitted to the application section 34. However, a timing when the login user information is obtained is not limited to this. It is also possible to obtain the login user information as needed after the print data is obtained.

Subsequently, the device control section 19 notifies, to the recording processing section 22, summary information in which a result of the print processing is taken into consideration (T9). The recording processing section 22 (i) updates the summary information which (a) is stored in the storage section 16 and (b) is indicative of the execution user and (ii) transmits, to the device control section 19 in response, a notification that the update of the summary information is complete (T10).

(1-5-5. Example of Data Transmission and Reception in a Case Where Application is Used from Terminal Device)

Figure 11:
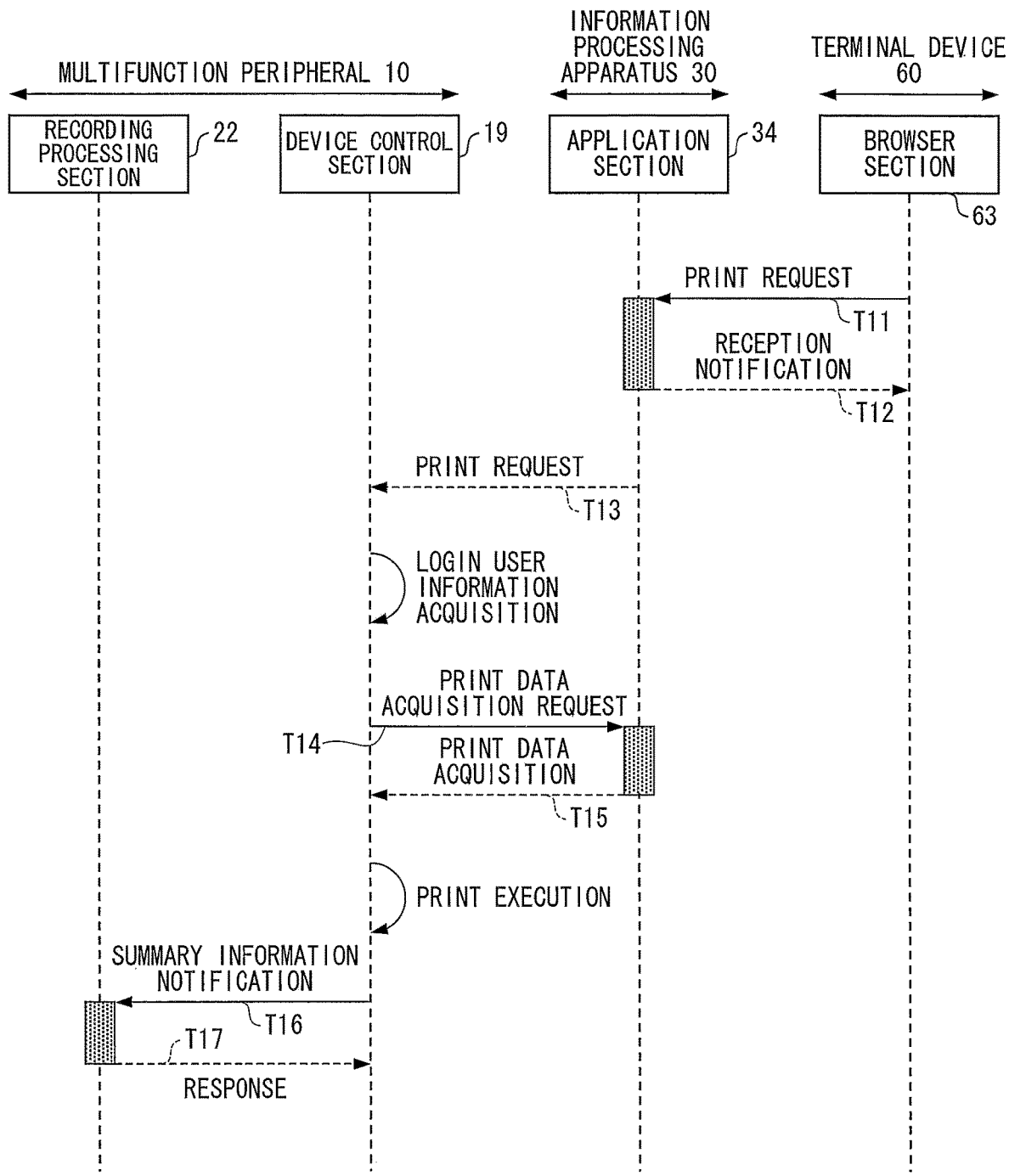
FIG. 11 is an explanatory diagram illustrating a flow of data in the multifunction peripheral control system illustrated in FIG. 1.

FIG. 11 is an explanatory diagram illustrating a flow of data in the processing in S44 and the subsequent processings in FIG. 3. As illustrated in FIG. 11, when the device control section 64 of the terminal device 60 receives, in S44 in FIG. 3, the instruction to select an application which instruction has been inputted from the user, the device control section 64 transmits a print request (function execution request) to the application section 34 of the information processing apparatus 30 via the browser section 63 (T11). The application section 34 (i) transmits, to the terminal device 60, a notification that the print request has been received (T12) and (ii) transmits the print request to the multifunction peripheral 10 (T13).

When the device control section 19 of the multifunction peripheral 10 receives the print request from the application section 34, the device control section 19 (i) obtains login user information (user information of a user logged in to the application) included in the print request and (ii) transmits a print data acquisition request to the application section 34 (T14). When the application section receives the print data acquisition request, the application section 34 transmits print data in accordance with the print data acquisition request to the multifunction peripheral 10 (T15).

When the device control section 19 receives the print data transmitted from the information processing apparatus 30, the device control section 19 carries out the processing in S71 in FIG. 4, that is, a processing to determine whether or not the print request (function execution request) corresponding to the print data (function execution instruction) has been carried out via the operation section 11 of the multifunction peripheral 10.

Then, since the print request has been made via the operation section 65 of the terminal device 60 in the example illustrated in FIG. 11, the print processing is carried out as illustrated in S74 in FIG. 4 so that the user who is currently logged in to the application (the user corresponding to the user of the login user information included in the print request obtained in T13) is set as the execution user.

Subsequently, the device control section 19 notifies, to the recording processing section 22, summary information in which a result of the print processing is taken into consideration (T16). The recording processing section 22 (i) updates the summary information which (a) is stored in the storage section 16 and (b) is indicative of the execution user and (ii) transmits, to the device control section 19 in response, a notification that the update of the summary information is complete (T17).

As has been described, according to the present embodiment, in a case where a user who has made a function execution request is identical to a user who has logged in to the multifunction peripheral 10, the user who has logged in to the multifunction peripheral 10 is set as the execution user. On the other hand, in a case where the user who has made the function execution request is identical to a user who, from the terminal device 60, has logged in to the application that operates on the application section 34, the user who has logged in to the application is set as the execution user.

This makes it possible to appropriately summarize, for each user, a history of use of the multifunction peripheral 10 etc. for each user, regardless of whether the user has logged in via the multifunction peripheral 10 or the user has logged in via the terminal device 60. Further, after the application that operates on the information processing apparatus 30 is instructed to carry out the cooperative processing, it is unnecessary to conduct, with respect to the input section 12 of the multifunction peripheral 10, an operation for reflecting a result of the cooperative processing in the use history information managed by the multifunction peripheral 10. This allows an improvement in user convenience.

The present embodiment has discussed a case where the application executed by the application section 34 of the information processing apparatus 30 is a print application. Note, however, that the application executed by the application section 34 is not limited to this.

For example, the application can be a scan transmission application in which the application section 34 causes the multifunction peripheral 10 to carry out a scan processing and a transmission processing of transmitting scan data. Then, in a case where the user selects the scan transmission application in S8 in FIG. 2, the device control section 19 of the multifunction peripheral 10 transmits in S9, in FIG. 2 to the information processing apparatus 30, a start request for starting the scan device application. When the application section 34 receives the start request for starting the scan device application (S23 in FIG. 2), the application section 34 (i) includes, in the application screen of the scan transmission application, a scan condition and information on a transmission destination to which the scan data is transmitted and (ii) transmits, in response, the application screen to the multifunction peripheral 10 (S24 in FIG. 2). Subsequently, in the multifunction peripheral 10, (i) an execution user is specified by a processing similar to that illustrated in FIG. 4 and (ii) the scan processing and the transmission processing of the scan data are carried out.

According to the present embodiment, for each user, (i) user information of the user in a case where the user logs in to the multifunction peripheral 10 via the operation section 12 of the multifunction peripheral 10 and (ii) user information of the user in a case where the user logs in to an application that operates on the application section 24 are shared by the each user. Note, however, that the present embodiment is not limited to this. For example, the multifunction peripheral 10 can be configured such that (i) different user information is used for a single user in (a) a case where the user logs in to the multifunction peripheral from the operation section 12 of the multifunction peripheral 10 and (b) a case where the user logs in to the application that operates on the application section 24 and (ii) in both cases (a) and (b), use history information of the user is to be managed as use history information of the single user. That is, the multifunction peripheral 10 can be arranged such that (i) user information of (a) a user in a case where the user logs in to the multifunction peripheral from the operation section 12 of the multifunction peripheral 10 and user information of (b) a user in a case where the user logs in to the application that operates on the application section 24 are stored such that the user information of the respective users (a) and (b) are associated with each other and (ii) (A) use history information of the user (a) and (B) use history information of the user (b) are managed in common between a case in which the user logs in with the information (A) and a case in which the user logs in with the information (B).

Embodiment 2

The following description will discuss another embodiment of the present invention. Note that for easy explanation, the same reference signs will be given to a member having the same function as a member described in Embodiment 1, and descriptions on such a member will be omitted.

In Embodiment 1, when the device control section 19 of the multifunction peripheral 10 receives a function execution request from the browser section 20 or the information processing apparatus 30, the device control section 19 determines whether or not the function execution request was made from the operation section 11 (browser section 20) of itself (the multifunction peripheral 10). In a case where the device control section 19 determines that the function execution request was made from the operation section 11 of the multifunction peripheral 10, a user currently logged in to the multifunction peripheral 10 is set as an execution user.

In contrast, according to the present embodiment, a user different from a user who actually logged in to a multifunction peripheral 10 and made a function execution request can be designated as an execution user. For example, in a case where a secretary of a president of a company logs in to the multifunction peripheral 10 and carries out printing in place of the president, it is possible to (i) carry out printing by setting the president, not the secretary, as the execution user and (ii) set the president as a person with respect to whom a result of carrying out printing can be summarized.

Figure 14:
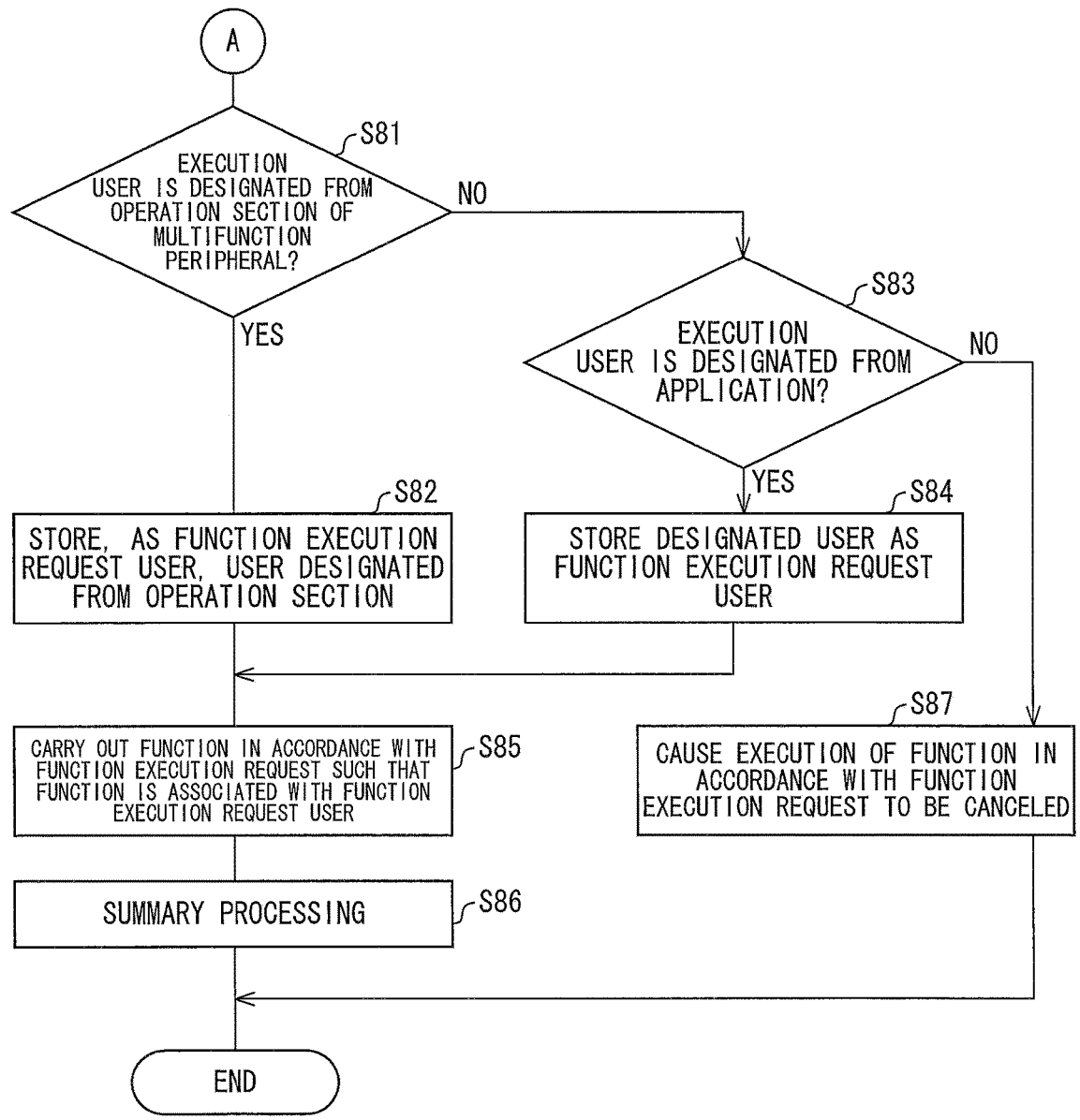
FIG. 14 is a flow chart illustrating a flow of a processing in the multifunction peripheral control system illustrated in FIG. 12.

A device arrangement of the multifunction peripheral control system 1 in accordance with the present embodiment is identical to that in Embodiment 1, except that (i) the application screen displayed in the processing in S10 in FIG. 2 or the processing in S43 in FIG. 3 is an application screen illustrated in FIG. 12 instead of the application screen illustrated in FIG. 8, and (ii) after the multifunction peripheral 10 receives a function execution request in S11 in FIG. 2 or at S11b in FIG. 3, the multifunction peripheral 10 carries out the processing shown in FIG. 14 in place of the processing shown in FIG. 4.

FIG. 12 is an explanatory diagram illustrating an example of an application screen displayed on the display section 13 of the multifunction peripheral or on the display section 67 of the terminal device 60 in S10 in FIG. 2 or S43 in FIG. 3. In the example illustrated in FIG. 12, in addition to an item (an item for selecting a function for which a function execution request is to be made) for selecting print data, an item (a list of users available to select as an execution user) for selecting a user with respect to whom results of carrying out printing are counted in a summary processing is displayed.

Note that when the application section 34 of the information processing apparatus 30 receives an application start request in S23 in FIG. 2 or S61 in FIG. 3, the application section 34 responds by (i) including, in screen data of the application screen to be transmitted in response to the request, an item for selecting a user to be designated as an execution user and (ii) transmitting the screen data.

Specifically, as illustrated in FIG. 13, the information processing apparatus 30 has registered therein users by groups and users belonging to the same group can designate each other as an execution user. The application section 34 of the information processing apparatus 30 (i) extracts users who belong to the same group as the user who has made the application start request, (ii) generates an application screen which includes an item for selecting a user to be designated as an execution user out of the extracted users, and (iii) transmits the application screen to the multifunction peripheral 10 or the terminal device 60.

Further, in a case where the application section 34 transmits the application screen to the multifunction peripheral 10, the application section 34 includes, in the screen data of the application screen, (or adds, to the screen data of the application screen) information for setting, as an execution user who carries out a function in accordance with a function execution request, an execution user selected by the user by inputting to the application screen an instruction to select the execution user.

Further, in a case where the application section 34 transmits the application screen to the terminal device 60, the application section 34 (i) receives, from the terminal device 60 and together with the function execution request in S63 in FIG. 3, an execution user selected by the user by inputting to the application screen an instruction to select the execution user and (ii), when the application section 34 transmits the function execution request to the multifunction peripheral 10 in S64, the application section (i) includes, in the function execution request, information for causing the user designated by the user of the terminal device 60 to set a function in accordance with the function execution request and (ii) transmits the function to the multifunction peripheral 10.

Subsequently, when the browser section 20 of the multifunction peripheral 10 receives a function execution request in the processing in S11 in FIG. 2 or the processing in S11b in FIG. 13, the browser section 20 carries out the processing shown in FIG. 14.

That is, when the device control section 19 of the multifunction peripheral 10 receives, from the browser section 20 or the information processing apparatus 30, a function execution request and an instruction to designate an execution user in S11 in FIG. 2 or S11b in FIG. 3, the device control section 19 determines, on the basis of information included in the function execution request received from the information processing apparatus 30 (or information added to the device execution request), whether to set, as an execution user, a user whose selection has been instructed from the operation section 11 of multifunction peripheral 10 or set, as an execution user, a user designated by the application section 34 (S81).

Then, in a case where the device control section 19 determines in S81 to set, as an execution user, the user whose selection has been instructed via the operation section 11 of the multifunction peripheral 10, the device control section 19 causes the storage section 16c to store, as a function execution request user, a user whose selection has been instructed from the operation section 11 of the multifunction peripheral 10 by a user logged in to the multifunction peripheral 10 in S11 in FIG. 2 (S82).

On the other hand, in a case where the device control section 19 determines in S81 not to set, as an execution user, the user whose selection has been instructed from the operation section 11 of the multifunction peripheral 10, (in a case where the device control section 19 determines to set, as an execution user, the user designated by the application section 34), the device control section 19 determines whether or not the function execution instruction from the information processing apparatus 30 includes information which designates a function execution user (execution user) (S83).

Then, in a case where the device control section 19 determines in S83 that the function execution instruction includes the information which designates a function execution user (execution user), the device control section 19 causes the function execution user storage section 16c to store, as a function execution request user, a user designated by the information (S84). Note that in a case where the device control section 19 determines in S83 that the function execution instruction does not include information which designates a function execution user (execution user), the device control section 19 causes the execution of the function in accordance with the function execution instruction received from the information processing apparatus 30 to be canceled (S87), and ends the processing.

After the device control section 19 causes the function execution request user to be stored in the function execution user storage section 16c in S82 or S84, the device control section 19 carries out a function in accordance with the function execution request such that the function is associated with the function execution request user stored in the function execution user storage section 16c (such that the function execution request user is set as the execution user) (S85).

Subsequently, the device control section 19 carries out a summary processing of updating summary information of the execution user associated in S85 (S86), and ends the processing.

Figure 15:
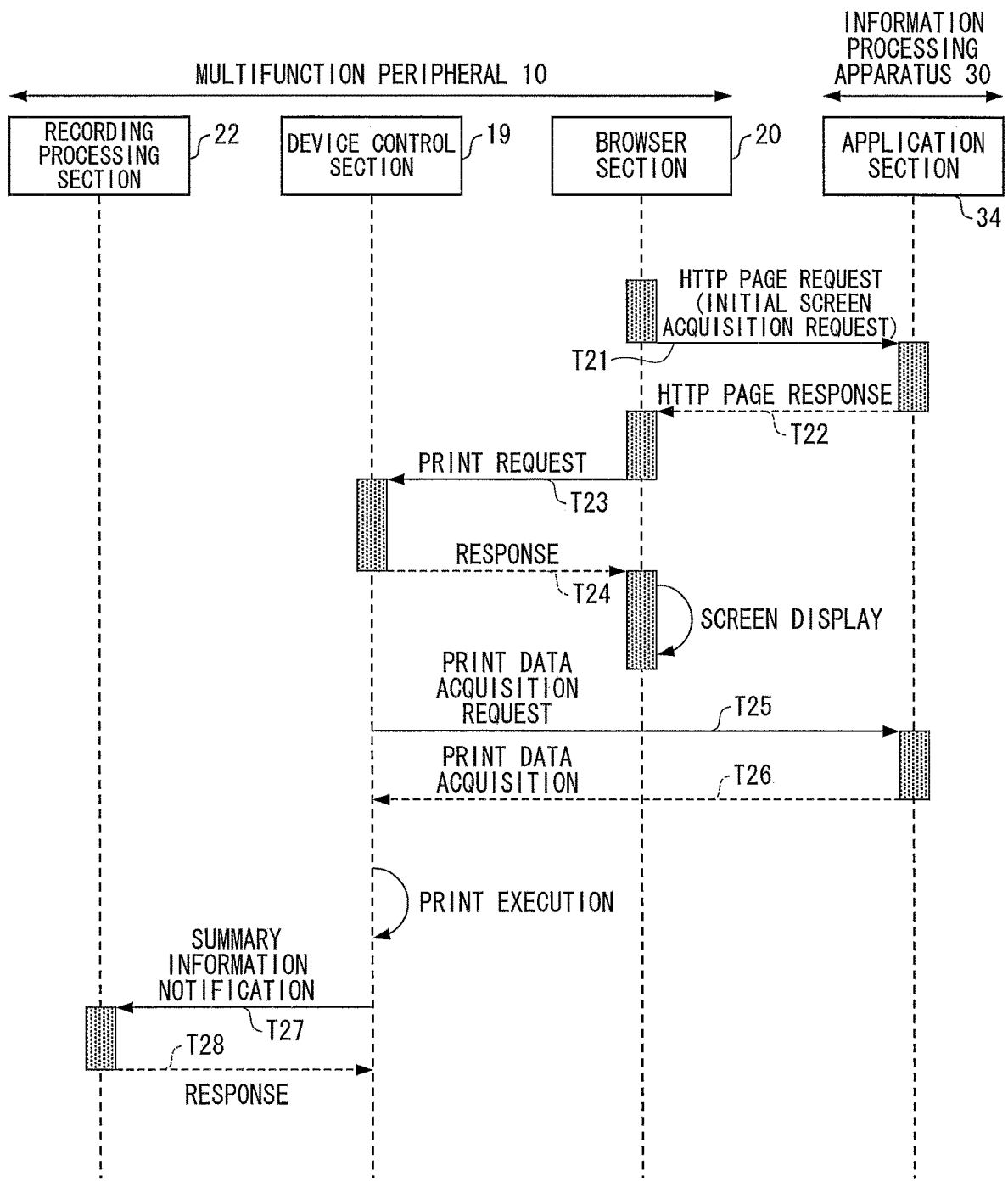
FIG. 15 is an explanatory diagram illustrating a flow of data in the multifunction peripheral control system illustrated in FIG. 12.

FIG. 15 is an explanatory diagram illustrating a flow of data in a case where the user logged in to the multifunction peripheral 10 makes a function execution request by designating the execution user from the operation section 11.

As shown in FIG. 15, when the browser section 20 receives from the user an instruction to select an application in S8 shown in FIG. 2, the browser section 20 transmits, to the application section 34 of the information processing apparatus 30, an initial screen acquisition request (HTTP Page request) (T21).

When the application section 34 receives the initial screen acquisition request, the application section 34 in response transmits screen data (HTTP Page response) of an initial screen in accordance with the request (T22).

The browser section 20 (i) causes an initial screen to be displayed on the display section 13 on the basis of the screen data of the initial screen obtained from the application section 34, (ii) obtains a print request (function execution request) and an instruction to designate an execution user which are inputted to the initial screen by the user from the input section 12 and (iii) transmits the print request and the instruction to the device control section 19 (T23).

When the device control section 19 receives the print request (function execution request), the device control section 19 determines, on the basis of information included in the print request, whether to set, as an execution user, a user whose selection has been instructed by the user logged in to the multifunction peripheral 10 or to set, as an execution user, a user designated by the application section 34. Further, the device control section 19 notifies the browser section 20 that the device control section 19 has received the print request (function execution request) (T24), and the browser section 20 notified causes the display section 13 to display an indication that a printing process is being carried out (the function is being carried out).

Further, the device control section 19 transmits a print data acquisition request (function execution request) to the application section 34 of the information processing apparatus 30 (T25), and the application section 34 transmits, to the multifunction peripheral 10, print data (function execution instruction) in accordance with the print data acquisition request (T26).

When the device control section 19 receives the print data transmitted from the information processing apparatus 30, the device control section 19 (i) sets an execution user in accordance with a result of determination of whether to set, as the execution user, a user whose selection has been instructed by the user logged in to the multifunction peripheral 10 or to set, as the execution user, a user designated by the application section 34 and (ii) carries out printing processing such that the printing processing is associated with the execution user set.

Subsequently, the device control section 19 notifies the recording processing section 22 of (i) summary information which takes account of a result of the print processing and (ii) information indicative of the execution user (T27), and the recording processing section 22 (i) updates summary information, stored in the storage section 16, on the execution user and (ii) transmits to the device control section 19 in response a notification that the update has been completed (T28).

As described above, according to the present embodiment, a user who logs in to the multifunction peripheral 10 can select an execution user and cause a function of the multifunction peripheral 10 to be carried out such that the function is associated with the execution user.

Accordingly, in a case where, for example, a user who logs in to the multifunction peripheral 10 carries out a function in place of another user, a summary processing (e.g., billing processing) can be carried out under the name of the another user. This allows the summary processing to be carried out appropriately in accordance with the reality of usage of the multifunction peripheral 10.

Embodiment 3

The following description will discuss still another embodiment of the present invention. Note that for easy explanation, the same reference signs will be given to a member having the same function as a member described in any of the embodiments described above, and descriptions on such a member will be omitted.

In Embodiments 1 and 2, a user authentication processing of a user who logs in to the multifunction peripheral 10 is carried out by the authentication processing section 21 of the multifunction peripheral 10. In contrast, in the present embodiment, a user authentication processing of a user who logs in to the multifunction peripheral 10 is carried out by an authentication server 80 which is connected to the multifunction peripheral 10 via the communication network 50 so as to communicate with the multifunction peripheral 10.

Figure 16:
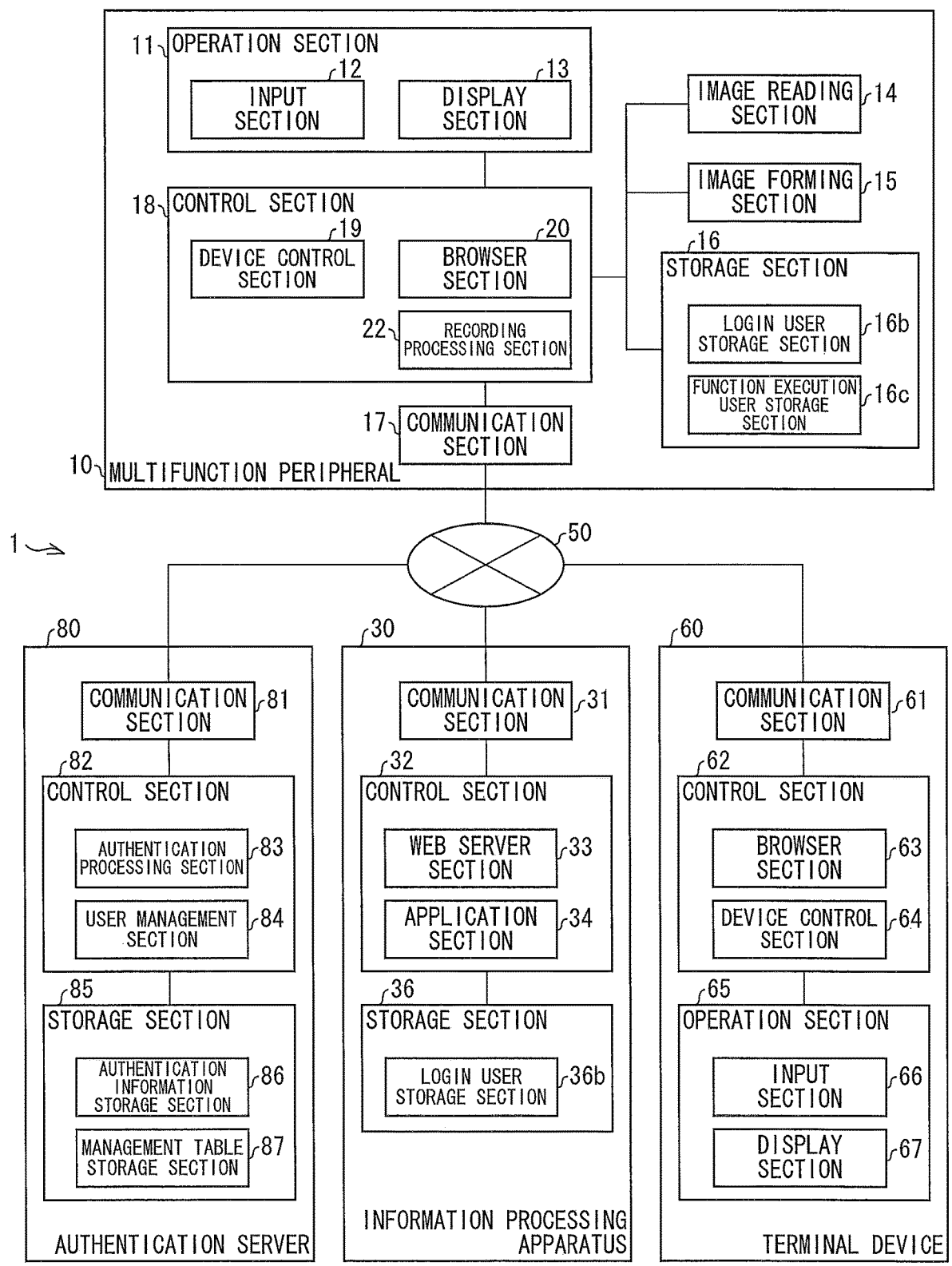
FIG. 16 is an explanatory diagram illustrating an arrangement of a multifunction peripheral control system in accordance with still another embodiment of the present invention.

FIG. 16 is an explanatory diagram illustrating an example of an arrangement of the multifunction peripheral control system 1 in accordance with the present embodiment. In the example illustrated in FIG. 16, the authentication server 80 is connected to the communication network 50 in addition to the multifunction peripheral 10, the information processing apparatus 30, and the terminal device 60. Further, the authentication processing section 21 and the authentication information storage section 16a in the multifunction peripheral 10 illustrated in FIG. 1 and the authentication processing section 35 and the authentication information storage section 36a in the information processing apparatus 30 illustrated in FIG. 1 are omitted, and an authentication processing section 83 and an authentication information storage section 86, which carry out functions of the authentication processing section 21, the authentication information storage section 16a, the authentication processing section 35, and the authentication information storage section 36a are included in the authentication server 80.

The authentication server 80 includes a communication section 81, a control section 82, and a storage section 85. The control section 82 includes the authentication processing section 83 and a user management section 84. The storage section 85 includes the authentication information storage section 86 and a management table storage section 87.

The communication section 81 is a communication interface which carries out communication with external devices, such as the multifunction peripheral 10, the information processing apparatus 30, and the terminal device 60, via the communication network 50.

The control section 82 is a computer device constituted by an arithmetic processing section (not shown) such as a CPU or a dedicated processor and a storage section (not shown) such as a RAM, a ROM, or a HDD. The control section 82 realizes a function of each of the authentication processing section 83 and the user management section 84 by reading out and executing a program, stored in the storage section, for carrying out various information and various controls.

The authentication information storage section 86 stores user authentication information (e.g., a login name and a password) on a user to be given permission to use the multifunction peripheral 10. The authentication information storage section 86 stores user authentication information (e.g., a login name and a password) of a user to be given permission to use an application executed on the application section 34.

Note that it is possible to employ an arrangement in which the authentication server 80 carries out a user authentication processing with respect to a plurality of multifunction peripherals connected to the multifunction peripheral control system 1. In this case, the authentication information storage section 86 may store, for each of the plurality of multifunction peripherals, user authentication information of a user to be given permission to use the each of the plurality of multifunction peripherals. Similarly, it is possible to employ an arrangement in which the authentication server 80 carries out a user authentication processing with respect to a plurality of applications (web applications) executed in the multifunction peripheral control system 1. In this case, the authentication information storage section 86 may store, for each of the plurality of applications, user authentication information of a user to be given permission to use the each of the plurality of applications. Or alternatively, user authentication information common to the plurality of multifunction peripherals and/or the plurality of applications may be used as user authentication information of each user, so that each user can log in using the user authentication information that is common to the plurality of multifunction peripherals and/or the plurality of applications.

In a case where the authentication processing section 83 carries out a user authentication processing of a user who intends to use the multifunction peripheral 10, the authentication processing section 83 (i) carries out a user authentication processing in which user information inputted from the operation section 11 by a user who intends to use the multifunction peripheral 10 is compared with user authentication information, stored in the authentication information storage section 86, on a user to be given permission to use the multifunction peripheral 10 and (ii) transmits a result of the user authentication processing to the multifunction peripheral 10. Note that the user information inputted from the operation section by the user who intends to use the multifunction peripheral 10 is transmitted by the device control section of the multifunction peripheral 10 from the communication section 17 to the authentication server 80. Further, in a case where it is determined by the user authentication processing that the user is to be given permission to use the multifunction peripheral 10, the device control section 19 of the multifunction peripheral 10 (i) causes an operation screen of the multifunction peripheral 10 to be displayed on the display section 13 so as to make the multifunction peripheral 10 available and (ii) causes the login user storage section 16b to store user information (login information of the user who has logged in) of the user whose user authentication processing has been carried out.

Further, in a case where the authentication processing section 83 carries out a user authentication processing of a user who intends to use an application executed in the application section 34, the authentication processing section 83 (i) carries out a user authentication processing in which user information inputted from the operation section 65 of the terminal device by the user who intends to use the application is compared with user authentication information, stored in the authentication information storage section 86, of a user to be given permission to use the application and (ii) transmits a result of the user authentication processing to the terminal device 60.

Note that the user information inputted from the operation section 65 by the user who intends to use the application is transmitted by the device control section 64 of the terminal device 60 from the communication section 17 to the authentication server 80. Further, in a case where it is determined by the user authentication processing that the user is to be given permission to use the application, the device control section 64 of the terminal device 60 (i) causes an operation screen of the application to be displayed on the display section 67 so as to make the application available and (ii) causes the login user storage section 36b to store user information (login information of the user who has logged in) of the user whose user authentication processing has been carried out.

The management table storage section 87 stores, for each user, (i) use history information, for each user, of the multifunction peripheral 10 and/or an application (an application which operates in the application section 34) (e.g., the accumulated total number of prints, accumulated total number of scans, the number of transmission times of image data, storage capacity for image data) and use-possible condition information (e.g., an upper limit of the number of printable sheets, an upper limit of the number of scans, an upper limit of the number of image data transmission times, an upper limit of the image data storage capacity, and the like).

The user management section 84 (i) obtains, from the multifunction peripheral 10, use history information of the multifunction peripheral 10 and/or the application (e.g., information on the number of prints, the execution user, etc.) and (ii) updates information related to the user and stored in the management table storage section 87. Further, in a case where the user management section 84 receives, from the multifunction peripheral 10 or the terminal device 60, an inquiry as to whether or not a function execution request made by a user can be carried out, the user management section 84 (i) determines, on the basis of (a) a content of the function execution request made by the user and (b) use-possible condition information stored in the management table storage section 87, whether or not a processing can be carried out in accordance with the function execution request and (ii) responds to the multifunction peripheral 10 or the terminal device 60.

(Example of Program)

In each of the embodiments described above, the control section 18 of the multifunction peripheral 10, the control section 32 of the information processing apparatus 30, the control section 62 of the terminal device 60, and the control section 82 of the authentication server 80 may each be (i) realized by hardware using a logic circuit provided on an integrated circuit (IC chip) or (ii) realized by software as executed by a CPU (Central Processing Unit).

In the latter case, the multifunction peripheral 10, the information processing apparatus 30, the terminal device 60, and the authentication server 80 each includes: a CPU that executes instructions of a program that realizes the foregoing functions; ROM (Read Only Memory) storing the program; RAM (Random Access Memory) that develops the program; a storage device (recording medium) storing the program and various data; and the like. The object of the present invention can be achieved by loading, to each of the multifunction peripheral 10, the information processing apparatus 30, the terminal device 60, and the authentication server 80, the recording medium, in which program code (an executable program, an intermediate code program, and a source program) of the control program (software for implementing the functions) of each of the multifunction peripheral 10, the information processing apparatus 30, the terminal device 60, and the authentication server 80 and (ii) causing the computer (or a CPU or an MPU) to read out and execute the program code recorded in the recording medium.

A non-transitory tangible medium, for example, a tape such as a magnetic tape or a cassette tape; a disk including (i) a magnetic disk such as a Floppy® disk or a hard disk and (ii) an optical disc such as a CD-ROM, an MO, an MD, a DVD, or a CD-R; a card such as an IC card (including a memory card) or an optical card; a semiconductor memory such as a mask ROM, an EPROM, an EEPROM®, or a flash ROM; a logic circuit such as a PLD (Programmable Logic Device) or an FPGA (Field Programmable Gate Array); or the like, can be used as the recording medium.

Further note that the multifunction peripheral 10, the information processing apparatus 30, the terminal device 60, and the authentication server 80 can be configured so as to be capable of being connected to a communications network via which the program code is loaded to the multifunction peripheral 10, the information processing apparatus 30, the terminal device 60, and the authentication server 80. The communications network is not limited to a specific one as long as it is capable of transmitting a program code. The communications network can be, for example, an internet, an intranet, an extranet, a LAN, an ISDN, a VAN, a CATV communications network, a virtual private network, a telephone network, a mobile telecommunications network, a satellite communication network or the like. A transmission medium that constitutes the communications network is also not limited to a specific one as long as it is capable of transmitting a program code. The examples of the transmission medium encompass (i) wired communications such as IEEE1394, USB, a power-line carrier, a CATV line, a telephone line, or ADSL (Asymmetric Digital Subscriber Line) and (ii) wireless communications such as infrared communication by means of IrDA or remote control, Bluetooth®, IEEE802.11 wireless, HDR (High Data Rate), NFC (Near Field Communication), DLNA (Digital Living Network Alliance), a mobile phone network, a satellite circuit, or a terrestrial digital network. Note that the present invention can be realized also by means of a computer data signal embedded in a carrier wave, which computer data signal is obtained by embodying the program code in electronic transmission.

[Conclusion]

A multifunction peripheral in accordance with a first aspect of the present invention is a multifunction peripheral which carries out a cooperative processing together with an application that operates on an information processing apparatus, the multifunction peripheral and the information processing apparatus being connected to each other via a communication network so as to communicate with each other, comprising: an input section configured to receive an instruction inputted by a user; a storage section configured to store use history information such that the use history information is associated with an execution user who carries out the cooperative processing, the use history information being indicative of a history of use of the cooperative processing; and a control section configured to control an operation of each section of the multifunction peripheral, the multifunction peripheral having (i) a first function of carrying out the cooperative processing in accordance with an instruction which the input section receives from the user and (ii) a second function of carrying out the cooperative processing in accordance with an instruction from the application, in a case where the cooperative processing is carried out using the second function, the control section (i) setting, as an execution user who carries out the cooperative processing, a user designated by the application and (ii) carrying out the cooperative processing, in a case where the cooperative processing is carried out using the first function, the control section (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the control section causing use history information which is stored in the storage section and corresponds to the execution user to be updated in accordance with a result of carrying out the cooperative processing, regardless of whether the first function is used or the second function is used.

According to the arrangement, in a case where the control section carries out the cooperative processing using the second function, the control section (i) sets, as an execution user who carries out the cooperative processing, a user designated by the application and (ii) carries out the cooperative processing, and in a case where the control section carries out the cooperative processing using the first function, the control section (i) sets, as an execution user who carries out the cooperative processing, a user inputted or designated from the input section and (ii) caries out the cooperative processing. In accordance with a result of carrying out the cooperative processing, the control section updates use history information which is stored in the storage section and corresponds to an execution user of the cooperative processing. This makes it possible to appropriately manage use history information regardless of whether the cooperative processing has been carried out by the first function or by the second function.

Further, in a case where an execution user of the cooperative processing carried out using the first function and an execution user of the cooperative processing carried out using the second function are identical, the control section manages, as use history information corresponding to a single user, use history information corresponding to the execution user, regardless of whether the first function has been used or the second function has been used. Accordingly, use histories corresponding to a single user can be managed as use history information corresponding to the single user, regardless of whether the first function has been used or the second function has been used.

In a second aspect of the present invention, the multifunction peripheral in accordance with the first aspect of the present invention is arranged such that a case where the cooperative processing is carried out using the first function, the control section sets, as an execution user who carries out the cooperative processing, a user who gives, from the input section, an instruction to carry out the cooperative processing.

In a third aspect of the present invention, the multifunction peripheral in accordance with the second aspect of the present invention is arranged such that the multifunction peripheral further comprises a first authentication processing section configured to carry out, with respect to a user who intends to use the multifunction peripheral, a user authentication processing so as to give, only to a user to be given permission to use the multifunction peripheral, permission to log in to the multifunction peripheral, in a case where an instruction to carry out the cooperative processing is received from the input section, the control section setting, as an execution user who carries out the cooperative processing, a user who is currently logged in to the multifunction peripheral.

According to each of the arrangements, use history information corresponding to a user who has carried out the cooperative processing using the first function can be appropriately managed.

In a fourth aspect of the present invention, the multifunction peripheral in accordance with the first aspect of the present invention is arranged such that in a case where the cooperative processing is carried out using the first function, the control section sets, as an execution user who carries out the cooperative processing, a user designated by a user who gives, from the input section, an instruction to carry out the cooperative processing.

According to the arrangement, in a case where a user who actually gives the input section of the multifunctional peripheral an instruction to carry out a cooperative processing is different from a user who is to be set as an execution user of the cooperative processing, the user who gives the input section the instruction to carry out the cooperative processing can designate, as the execution user, the user to be set. For example, in a case where a user B, in place of a user A who intends to use a cooperative processing, gives from the input section of the multifunction peripheral an instruction to carry out the cooperative processing, it is possible to designate, as the execution user, the user A instead of the user B and cause use history information of the user A to be updated.

In a fifth aspect of the present invention, the multifunction peripheral in accordance with the fourth aspect of the present invention is arranged such that the multifunction peripheral further comprises a display section configured to display information to be presented to a user, the control section (i) displaying a list of users who are available, to be designated as an execution user who carries out the cooperative processing, by the user who gives from the input section the instruction to carry out the cooperative processing, and (ii) setting, as the execution user who carries out the cooperative processing, a user selected, from among the users included in the list, by the user who gives the instruction to carry out the cooperative processing.

According to the arrangement, a user who gives from the input section an instruction to carry out the cooperative processing sets in advance users who are available to be designated as an execution user of the cooperative processing. This allows an execution user to be selected from among the users set.

A multifunction peripheral control system in accordance with an aspect A of the present invention is a multifunction peripheral control system multifunction peripheral control system comprising a multifunction peripheral and an information processing apparatus, the multifunction peripheral and the information processing apparatus being connected to each other via a communication network so as to communicate with each other, the multifunction peripheral and an application which operates on the information processing apparatus carrying out a cooperative processing together, the multifunction peripheral including: an input section configured to receive an instruction inputted by a user; and a control section configured to control an operation of each section of the multifunction peripheral, the information processing apparatus including an application processing section configured to execute the application, the multifunction peripheral control system further comprising a storage section configured to store use history information such that the use history information is associated with an execution user who carries out the cooperative processing, the use history information being indicative of a history of use of the cooperative processing, the multifunction peripheral control system having (i) a first function of carrying out the cooperative processing in accordance with an instruction which the input section receives from the user and (ii) a second function of carrying out the cooperative processing in accordance with an instruction from the application, in a case where the cooperative processing is carried out using the second function, the control section (i) setting, as an execution user who carries out the cooperative processing, a user designated by the application and (ii) carrying out the cooperative processing, in a case where the cooperative processing is carried out using the first function, the control section (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the control section causing use history information which is stored in the storage section and corresponds to the execution user to be updated in accordance with a result of carrying out the cooperative processing, regardless of whether the first function is used or the second function is used.

According to the arrangement, in a case where the control section carries out the cooperative processing using the second function, the control section (i) sets, as an execution user who carries out the cooperative processing, a user designated by the application and (ii) carries out the cooperative processing, and in a case where the control section carries out the cooperative processing using the first function, the control section (i) sets, as an execution user who carries out the cooperative processing, a user inputted or designated from the input section and (ii) caries out the cooperative processing. In accordance with a result of carrying out the cooperative processing, the control section updates use history information which is stored in the storage section and related to an execution user of the cooperative processing. This makes it possible to appropriately manage use history information regardless of whether the cooperative processing has been carried out by the first function or by the second function.

Further, in a case where an execution user of the cooperative processing carried out using the first function and an execution user of the cooperative processing carried out using the second function are identical, the control section manages, as use history information corresponding to a single user, use history information corresponding to the execution user, regardless of whether the first function has been used or the second function has been used. Accordingly, use histories corresponding to a single user can be managed as use history information corresponding to the single user, regardless of whether the first function has been used or the second function has been used.

In an aspect B of the present invention, the multifunction peripheral control system in accordance with the aspect A of the present invention is arranged such that in a case where the cooperative processing is carried out using the second function, the application designates, as an execution user who carries out the cooperative processing, a user who gives the application an instruction to carry out the cooperative processing.

According to the arrangement, use history information corresponding to a user who has carried out the cooperative processing using the second function can be appropriately managed.

A method, in accordance with one aspect of the present invention, of managing a multifunction peripheral is a method of managing a multifunction peripheral, the multifunction peripheral carrying out a cooperative processing together with an application that operates on an information processing apparatus, the multifunction peripheral and the information processing apparatus being connected via a communication network so as to communicate with each other, the multifunction peripheral including an input section, the multifunction peripheral having (i) a first function of carrying out the cooperative processing in accordance with an instruction which the input section receives from a user and (ii) a second function of carrying out the cooperative processing in accordance with an instruction from the application, the method comprising the step of: (A) storing use history information such that the use history information is associated with an execution user who carries out the cooperative processing, the use history information being indicative of a history of use of the cooperative processing, in a case where the cooperative processing is carried out using the second function, the method (i) setting, as an execution user who carries out the cooperative processing, a user designated by the application and (ii) carrying out the cooperative processing, in a case where the cooperative processing is carried out using the first function, the method (i) setting, as an execution user who carries out the cooperative processing, a user inputted or designated from the input section and (ii) carrying out the cooperative processing, in a case where an execution user who carries out the cooperative processing using the first function and an execution user who carries out the cooperative processing using the second function are identical, the step (A) involving causing use history information corresponding to the execution user to be updated in accordance with a result of carrying out the cooperative processing, regardless of whether the first function is used or the second function is used.

According to the method, in a case where the cooperative processing is carried out using the second function, the method (i) sets, as an execution user who carries out the cooperative processing, a user designated by the application and (ii) carries out the cooperative processing, and in a case where the cooperative processing is carried out using the first function, the method (i) sets, as an execution user who carries out the cooperative processing, a user inputted or designated from the input section and (ii) caries out the cooperative processing. In accordance with a result of carrying out the cooperative processing, the control section updates use history information which is stored in the storage section and related to an execution user of the cooperative processing. This makes it possible to appropriately manage use history information regardless of whether the cooperative processing has been carried out by the first function or by the second function.

Further, in a case where an execution user of the cooperative processing carried out using the first function and an execution user of the cooperative processing carried out using the second function are identical, the method manages, as use history information corresponding to a single user, use history information corresponding to the execution user, regardless of whether the first function has been used or the second function has been used. Accordingly, use histories corresponding to a single user can be managed as use history information corresponding to the single user, regardless of whether the first function has been used or the second function has been used.

The present invention is not limited to the above-described embodiments but allows various modifications within the scope of the claims. In other words, any embodiment derived from a combination of two or more technical means appropriately modified within the scope of the claims will also be included in the technical scope of the present invention.

INDUSTRIAL APPLICABILITY

The present invention is applicable to (i) a multifunction peripheral control system in which a multifunction peripheral and an information processing apparatus, which are connected via a communication network so as to communicate with each other, carry out a cooperative processing and (ii) the multifunction peripheral included in the multifunction peripheral control system.

REFERENCE SIGNS LIST

1: MULTIFUNCTION PERIPHERAL CONTROL SYSTEM
10: MULTIFUNCTION PERIPHERAL
11: OPERATION SECTION
12: INPUT SECTION
13: DISPLAY SECTION
16: STORAGE SECTION
16a: AUTHENTICATION INFORMATION STORAGE SECTION
16b: LOGIN USER STORAGE SECTION
16c: FUNCTION EXECUTION USER STORAGE SECTION
17: COMMUNICATION SECTION
18: CONTROL SECTION
19: DEVICE CONTROL SECTION
20: BROWSER SECTION
21: AUTHENTICATION PROCESSING SECTION
22: RECORDING PROCESSING SECTION
30: INFORMATION PROCESSING APPARATUS
31: COMMUNICATION SECTION
32: CONTROL SECTION
33: WEB SERVER SECTION
34: APPLICATION SECTION
35: AUTHENTICATION PROCESSING SECTION
36: STORAGE SECTION
36a: AUTHENTICATION INFORMATION STORAGE SECTION
36b: LOGIN USER STORAGE SECTION
50: COMMUNICATION NETWORK
60: TERMINAL DEVICE
61: COMMUNICATION SECTION
62: CONTROL SECTION
63: BROWSER SECTION
64: DEVICE CONTROL SECTION
65: OPERATION SECTION
66: INPUT SECTION
67: DISPLAY SECTION
80: AUTHENTICATION SERVER
81: COMMUNICATION SECTION
82: CONTROL SECTION
83: AUTHENTICATION PROCESSING SECTION
84: USER MANAGEMENT SECTION
85: STORAGE SECTION
86: AUTHENTICATION INFORMATION STORAGE SECTION
87: MANAGEMENT TABLE STORAGE SECTION

The invention claimed is:

1. A multifunction peripheral which carries out an image processing according to an instruction of an application that operates on an information processing apparatus, the multifunction peripheral and the information processing apparatus being connected to each other via a communication network so as to communicate with each other, comprising:
an input of a user interface which receives an instruction inputted by a user;
a memory that stores use history information such that the use history information is associated with an execution user who carries out the image processing, the use history information being indicative of a history of use of the image processing; and
a processor that controls an operation of the multifunction peripheral, wherein
the multifunction peripheral includes (i) a first function of carrying out the image processing in accordance with an instruction which the input of the user interface receives from the user and (ii) a second function of carrying out the image processing in accordance with an instruction from the application,
in a case where the image processing is carried out using the second function, the processor (i) sets, as an execution user who carries out the image processing, a user designated and (ii) carries out the image processing,
in a case where the image processing is carried out using the first function, the processor (i) sets, as an execution user who carries out the image processing, a user inputted or designated from the input of the user interface and (ii) carries out the image processing,
in a case where an execution user who carries out the image processing using the first function and an execution user who carries out the image processing using the second function are identical, the processor causes use history information which is stored in the memory and corresponds to the execution user to be updated in accordance with a result of carrying out the image processing, regardless of whether the first function is used or the second function is used, and the processor counts a number of sheets used in each type of the image processing.

2. The multifunction peripheral as set forth in claim 1, wherein in a case where the image processing is carried out using the first function, the processor sets, as an execution user who carries out the image processing, a user who gives, from the input of the user interface, an instruction to carry out the image processing.

3. A multifunction peripheral as set forth in claim 2, wherein the processor further carries out, with respect to a user who intends to use the multifunction peripheral, a user authentication processing so as to give, only to a user to be given permission to use the multifunction peripheral, permission to log in to the multifunction peripheral, and in a case where an instruction to carry out the image processing is received from the input of the user interface, the processor sets, as an execution user who carries out the image processing, a user who is currently logged in to the multifunction peripheral.

4. The multifunction peripheral as set forth in claim 1, wherein in a case where the image processing is carried out using the first function, the processor sets, as an execution user who carries out the image processing, a user designated by a user who gives, from the input of the user interface, an instruction to carry out the image processing.

5. A multifunction peripheral as set forth in claim 4, further comprising:

a display panel that displays information to be presented to a user, wherein the processor (i) displays a list of users who are available, to be designated as an execution user who carries out the image processing, by the user who gives from the input of the user interface the instruction to carry out the image processing, and (ii) sets, as the execution user who carries out the image processing, a user selected, from among the users included in the list, by the user who gives the instruction to carry out the image processing.

6. The multifunction peripheral as set forth in claim 1, wherein the image processing is a printing processing.

7. The multifunction peripheral as set forth in claim 1, wherein the image processing is a scan processing.

8. The multifunction peripheral as set forth in claim 1, wherein the image processing is a transmission processing of a scan data.

9. The multifunction peripheral as set forth in claim 1, wherein the processor counts, on a per-user basis, a number of copied sheets, a number of scanned sheets, a number of faxed sheets, or a number of printed sheets.

10. An image processing method of an image processing system in which a multifunction peripheral and an information processing apparatus are connected to each other via a communication network so as to communicate with each other, and the multifunction peripheral has (i) a first function of carrying out image processing in accordance with an instruction which an input section included in the multifunction peripheral receives from a user and (ii) a second function of carrying out image processing in accordance with an instruction from an application that operates on the information processing apparatus, wherein the multifunction peripheral is configured such that in a case where the image processing is carried out using the second function, the multifunction peripheral (i) setting, as an execution user who carries out the image processing, a user designated and (ii) carrying out the image processing, in a case where the image processing is carried out using the first function, the multifunction peripheral (i) setting, as an execution user who carries out the image processing, a user inputted or designated from the input section and (ii) carrying out the image processing, in a case where an execution user who carries out the image processing using the first function and an execution user who carries out the image processing using the second function are identical, the multifunction peripheral causing history information of the image processing corresponding to the execution user to be updated in accordance with a result of carrying out the image processing, regardless of whether the first function is used or the second function is used, and counting a number of sheets used in each type of the image processing, and the application being configured such that in a case where the application causes the multifunction peripheral to carry out the image processing using the second function, the application transmits, to the multifunction peripheral, image data and information indicative of the execution user who carries out the image processing.

11. An information processing apparatus which carries out image processing with a multifunction peripheral connected to the information processing apparatus via a communication network so as to communicate with the information processing apparatus, the multifunction peripheral performing:

a first function of carrying out image processing in accordance with an instruction which an input section included in the multifunction peripheral receives from a user; and a second function of carrying out image processing in accordance with an instruction from the information processing apparatus connected to the multifunction peripheral via the communication network so as to communicate with the multifunction peripheral;

a storing function of storing history information of image processing such that the history information is associated with an execution user who carries out the printing processing;

a function of, in a case where the image processing is carried out using the second function, (i) setting, as an execution user who carries out the image processing, a user designated and (ii) carrying out the image processing;

a function of, in a case where the image processing is carried out using the first function, (i) setting, as an execution user who carries out the image processing, a user inputted or designated from the input section and (ii) carrying out the image processing;

a function of, in a case where an execution user who carries out the image processing using the first function and an execution user who carries out the image processing using the second function are identical, causing history information of the image processing corresponding to the execution user to be updated in accordance with a result of carrying out the image processing, regardless of whether the first function is used or the second function is used; and a function of counting a number of sheets used in each type of the image processing, wherein in a case where the information processing apparatus causes the multifunction peripheral to carry out the image processing using the second function, the information processing apparatus carrying out image data transmission processing of transmitting image data and information indicative of an execution user who carries out the image processing to the multifunction peripheral.

12. A computer-readable non-transitory storage medium, in which an application program for causing a computer included in an information processing apparatus as set forth in claim 11 to carry out the image data transmission processing is stored.

13. An image processing method carried out with an information processing apparatus connected to a multifunction peripheral so as to communicate with the multifunction peripheral via a communication network, the multifunction peripheral performing:

a first function of carrying out image processing in accordance with an instruction which an input section included in the multifunction peripheral receives from a user;

a second function of carrying out image processing in accordance with an instruction from the information processing apparatus connected to the multifunction peripheral via the communication network so as to communicate with the multifunction peripheral;

a storing function of storing history information of image processing such that the history information is associated with an execution user who carries out the printing processing;

a function of, in a case where the image processing is carried out using the second function, (i) setting, as an execution user who carries out the image processing, a user designated and (ii) carrying out the image processing;

a function of, in a case where the image processing is carried out using the first function, (i) setting, as an execution user who carries out the image processing, a user inputted or designated from the input section and (ii) carrying out the image processing;

a function of, in a case where an execution user who carries out the image processing using the first function and an execution user who carries out the image processing using the second function are identical, causing history information of the image processing corresponding to the execution user to be updated in accordance with a result of carrying out the image processing, regardless of whether the first function is used or the second function is used; and a function of counting a number of sheets used in each type of the image processing, wherein in a case where the information processing apparatus causes the multifunction peripheral to carry out the image processing using the second function, the information processing apparatus carrying out image data transmission processing of transmitting image data and information indicative of an execution user who carries out the image processing to the multifunction peripheral.

14. A method of using an information processing apparatus to control a multifunction peripheral via a network, the method comprising:

carrying out second image processing in accordance with an instruction from an application that operates on the information processing apparatus and carrying out first image processing in accordance with an instruction which an input of a user interface included in the multifunction peripheral receives from a user;

setting, on the multifunction peripheral, a user designated as an execution user who carries out the image processing during the second image processing;

setting, on the multifunction peripheral, a user inputted or designated from the input of the user interface as the execution user who carries out the image processing during the first image processing;

causing history information of the image processing corresponding to the execution user to be updated, by the multifunction peripheral, in accordance with a result of carrying out the image processing in a case where an execution user who carries out the image processing using the first image processing and an execution user who carries out the image processing using the second image processing are identical; and counting a number of sheets used in each type of the image processing; wherein in a case where the application causes the multifunction peripheral to carry out the image processing using the second image processing, the application transmits, to the multifunction peripheral, image data and information indicative of the execution user who carries out the image processing.

15. A multifunction peripheral which carries out an image processing according to an instruction of an application that operates on an information processing apparatus, the multifunction peripheral and the information processing apparatus being connected to each other via a communication network so as to communicate with each other, comprising:

an input of a user interface which receives an instruction inputted by a user;

a memory that stores use history information such that the use history information is associated with an execution user who carries out the image processing, the use history information being indicative of a history of use of the image processing; and a processor that controls an operation of the multifunction peripheral, wherein the multifunction peripheral includes (i) a first function of carrying out the image processing in accordance with an instruction which the input of the user interface receives from the user and (ii) a second function of carrying out the image processing in accordance with an instruction from the application, in a case where the image processing is carried out using the second function, the processor (i) sets, as an execution user who carries out the image processing, a user designated and (ii) carries out the image processing, in a case where the image processing is carried out using the first function, the processor (i) sets, as an execution user who carries out the image processing, a user inputted or designated from the input of the user interface and (ii) carries out the image processing, in a case where an execution user who carries out the image processing with use of the first function or the second function has been determined as being a predetermined user, the processor causes use history information which corresponds to the predetermined user to be updated in accordance with a result of carrying out the image processing, and the processor counts a number of sheets used in each type of the image processing.

16. The multifunction peripheral as set forth in claim 15, wherein
- the processor further carries out, with respect to a user who intends to use the multifunction peripheral, a user authentication processing so as to give, only to a user to be given permission to use the multifunction peripheral, permission to log in to the multifunction peripheral, and
- in a case where an instruction to carry out the image processing is received from the input of the user interface, the processor sets, as an execution user who carries out the image processing, a user who is currently logged in to the multifunction peripheral.

17. The multifunction peripheral as set forth in claim 15, further comprising:
- a display panel that displays information to be presented to a user, wherein
- the processor (i) displays a list of users who are available, to be designated as an execution user who carries out the image processing, by the user who gives from the input of the user interface the instruction to carry out the image processing, and (ii) sets, as the execution user who carries out the image processing, a user selected, from among the users included in the list, by the user who gives the instruction to carry out the image processing.

18. The multifunction peripheral as set forth in claim 15, wherein the image processing is a printing processing, a scan processing, or a transmission processing of a scan data.

* * * * *